US012666355B2

(12) United States Patent
Murgai et al.

(10) Patent No.: US 12,666,355 B2
(45) Date of Patent: Jun. 23, 2026

(54) METHOD AND A SYSTEM FOR POWER MANAGEMENT OF THE ONE OR MORE BASE STATIONS IN A WIRELESS COMMUNICATION NETWORK

(71) Applicant: SAMSUNG ELECTRONICS CO., LTD., Suwon-si (KR)

(72) Inventors: Vishal Murgai, Bangalore (IN); Issaac Kommineni, Bangalore (IN); Mohan Rao Goli, Bangalore (IN); Srihari Das Sunkada Gopinath, Bangalore (IN); Swaraj Kumar, Bangalore (IN); Mallappa Prabhuswamy, Bangalore (IN); Sukhdeep Singh, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 441 days.

(21) Appl. No.: 17/992,302

(22) Filed: Nov. 22, 2022

(65) Prior Publication Data

US 2023/0118253 A1     Apr. 20, 2023

Related U.S. Application Data

(63) Continuation of application No. PCT/KR2022/015665, filed on Oct. 14, 2022.

(30) Foreign Application Priority Data

Oct. 14, 2021     (IN) ............................ 202141046922
Aug. 26, 2022     (IN) ............................ 2021 41046922

(51) Int. Cl.
*H04W 52/02*     (2009.01)
*H04W 24/10*     (2009.01)
*H04W 28/08*     (2023.01)

(52) U.S. Cl.
CPC ....... *H04W 52/0206* (2013.01); *H04W 24/10* (2013.01); *H04W 28/0942* (2020.05)

(58) Field of Classification Search
None
See application file for complete search history.

(56) References Cited

U.S. PATENT DOCUMENTS 8,738,022 B2     5/2014  Xing et al.
9,380,594 B1     6/2016  Malmirchegini et al.
                 (Continued)

FOREIGN PATENT DOCUMENTS

CN     101938754     1/2011
CN     111918370     11/2020
       (Continued)

OTHER PUBLICATIONS

Extended European Search Report dated Oct. 28, 2024 issued in European Patent Application No. 22881429.9.
(Continued)

*Primary Examiner* — Phirin Sam
(74) *Attorney, Agent, or Firm* — NIXON & VANDERHYE P.C.

(57)     ABSTRACT

A method implemented at one or more base stations for a power management of the one or more base stations in a wireless communication network is disclosed. The method includes transmitting, by the one or more base stations, a plurality of Key Performance Indicator (KPI) parameters associated with the one or more base stations to a federal server controller. The method includes receiving, by the one or more base stations from the federal server controller, a KPI relationship predicting a future load based on the plurality of KPI parameters associated with the one or more base stations. The method includes adjusting, by the one or more base stations, a Central Processing Unit (CPU) fre-
(Continued)

1200

TRANSMITTING, BY THE ONE OR MORE BASE STATIONS, A PLURALITY OF KEY PERFORMANCE INDICATOR (KPI) PARAMETERS ASSOCIATED WITH THE ONE OR MORE BASE STATIONS TO A FEDERAL SERVER CONTROLLER — 1202

RECEIVING, BY THE ONE OR MORE BASE STATIONS FROM THE FEDERAL SERVER CONTROLLER, A KPI RELATIONSHIP PREDICTING A FUTURE LOAD BASED ON THE PLURALITY OF KPI PARAMETERS ASSOCIATED WITH THE ONE OR MORE BASE STATIONS — 1204

ADJUSTING, BY THE ONE OR MORE BASE STATIONS, A CENTRAL PROCESSING UNIT (CPU) FREQUENCY ASSOCIATED WITH THE ONE OR MORE BASE STATIONS AUTONOMOUSLY BASED ON THE KPI RELATIONSHIP FOR MANAGING THE FUTURE LOAD ASSOCIATED WITH THE ONE OR MORE BASE STATIONS — 1206 quency associated with the one or more base stations autonomously based on the KPI relationship for managing the future load associated with the one or more base stations.

14 Claims, 15 Drawing Sheets

(56)                References Cited

U.S. PATENT DOCUMENTS

| 10,057,034 | B2 | 8/2018 | Yanover et al. |
| 10,542,488 | B1 | 1/2020 | Marupaduga et al. |
| 2014/0073322 | A1 | 3/2014 | Henderson et al. |
| 2014/0120930 | A1 | 5/2014 | Harris et al. |
| 2017/0026888 | A1 | 1/2017 | Kwan |
| 2017/0093033 | A1* | 3/2017 | Kolokotronis ........... H01Q 3/04 |
| 2018/0310258 | A1* | 10/2018 | Goria .................... H04W 24/02 |
| 2019/0272002 | A1 | 9/2019 | Seenappa et al. |
| 2020/0014507 | A1* | 1/2020 | Joseph .................. H04L 5/0091 |
| 2020/0015154 | A1 | 1/2020 | Pateromichelakis et al. |
| 2020/0159281 | A1 | 5/2020 | Seenappa et al. |
| 2021/0144517 | A1* | 5/2021 | Guim Bernat ........ G06F 9/5072 |
| 2021/0227461 | A1 | 7/2021 | Zhou et al. |
| 2022/0030397 | A1* | 1/2022 | Lisewski ................. H04W 4/08 |
| 2022/0038986 | A1* | 2/2022 | Soliman ................ H04W 40/02 |
| 2023/0239122 | A1* | 7/2023 | Xiong .................. H04B 1/7143 |
| | | | 370/280 |
| 2024/0022938 | A1* | 1/2024 | Malboubi ............... H04L 41/16 |
| 2024/0054058 | A1* | 2/2024 | Portman ............. G06F 11/1476 |
| 2024/0196178 | A1* | 6/2024 | Ying ....................... H04W 8/18 |

FOREIGN PATENT DOCUMENTS

| EP | 2880888 | 6/2020 |
| WO | 2013/052948 | 4/2013 |
| WO | WO2013052948 A2 | 4/2013 |
| WO | 2016/186742 | 11/2016 |

OTHER PUBLICATIONS

Search Report and Written Opinion dated Jan. 13, 2023 issued in International Patent Application No. PCT/KR2022/015665.
India Examination Report dated Dec. 10, 2024 for IN Application No. 202141046922.

* cited by examiner (Prior-Art)

(Prior-Art)

400

500

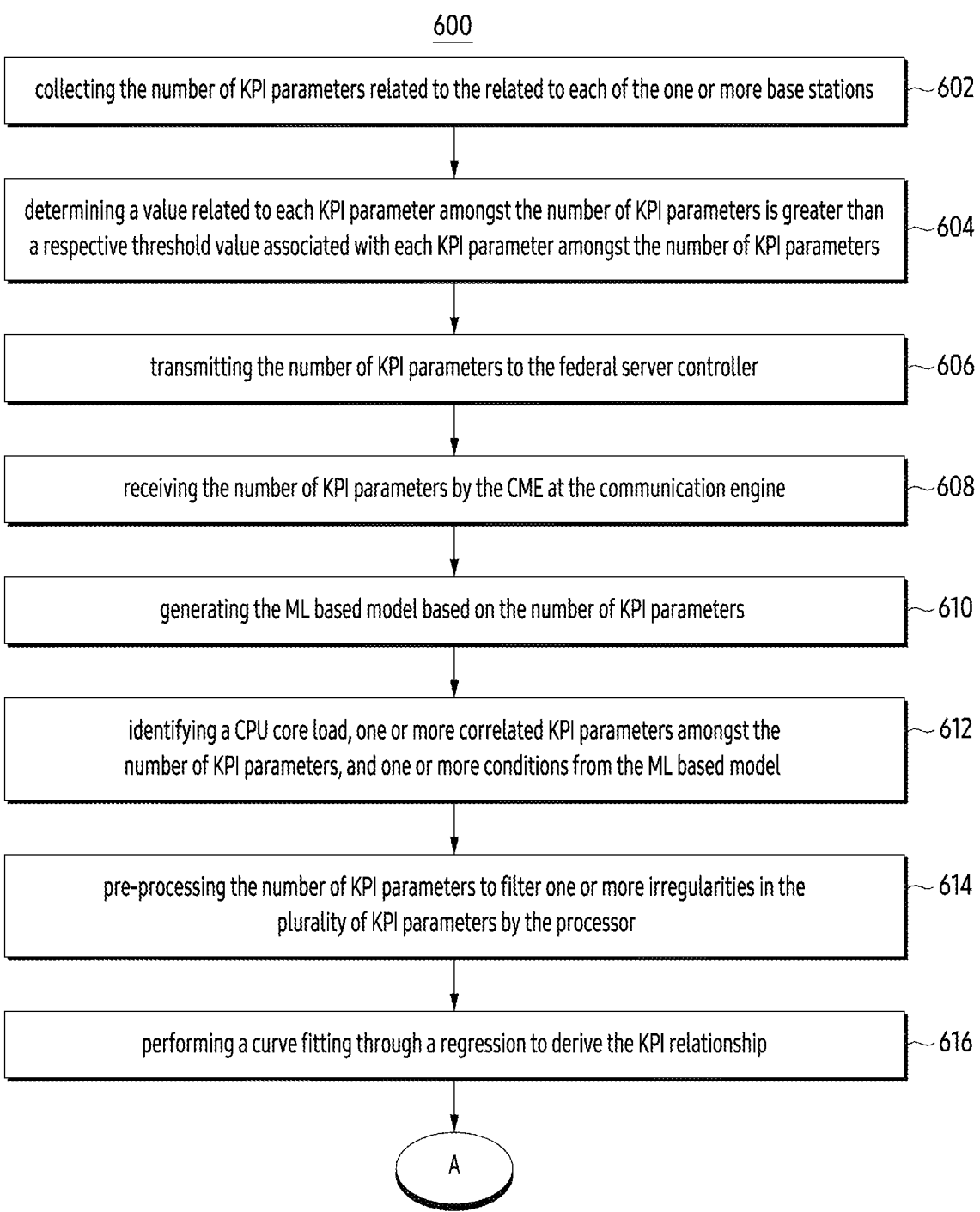

600 collecting the number of KPI parameters related to the related to each of the one or more base stations — 602 determining a value related to each KPI parameter amongst the number of KPI parameters is greater than a respective threshold value associated with each KPI parameter amongst the number of KPI parameters — 604 transmitting the number of KPI parameters to the federal server controller — 606 receiving the number of KPI parameters by the CME at the communication engine — 608 generating the ML based model based on the number of KPI parameters — 610 identifying a CPU core load, one or more correlated KPI parameters amongst the number of KPI parameters, and one or more conditions from the ML based model — 612 pre-processing the number of KPI parameters to filter one or more irregularities in the plurality of KPI parameters by the processor — 614 performing a curve fitting through a regression to derive the KPI relationship — 616

$$F_1 = a.avgLoad_{i-1}^3 + b.avgLoad_{i-1}$$

$$F_2 = F_1 + c.avgDLRX_{i-1} + b.avgLoad_{i-1}^2$$

$$F_3 = F_2 + e.DLRX_{i-1} \cdot avgLoad_{i-1} + f$$

1100

$$Load_i = b.avgLoad_{i-1} + c.Freq_{i-1}^3 + d.Freq_{i-1} + g.DLRX_{i-1} \cdot avgDLRX_{i-1} + h$$

$$\text{Where } avgLoad_n = \frac{\sum_{n-5}^{n} Load_n}{5} \text{ and } avgDLRX_n = \frac{\sum_{n-5}^{n} DLRX_n}{5}$$

$$b = 9.95668695e\text{-}01, \ c = 8.41721118e\text{-}02, \ d = -5.55968367e\text{-}01, \ g = 8.77631512e\text{-}16,$$
$$h = 7.20115522e\text{-}01$$

| Sign | Operator 1 | Exponent 1 | Operand | Operand 2 | Exponen 2 | Operand | Operand 3 | Exponent 3 |
|------|-----------|-----------|---------|-----------|-----------|---------|-----------|-----------|
| + | b | 1 | * | avgLoad | 1 | * | 1 | 0 |
| + | c | 1 | * | Freq | 3 | * | 1 | 0 |
| + | d | 1 | * | Freq | 1 | * | 1 | 0 |
| + | g | 1 | * | DLRX | 1 | * | avgDLRX | 1 |
| + | h | 1 | * | 1 | 0 | * | 1 | 0 |

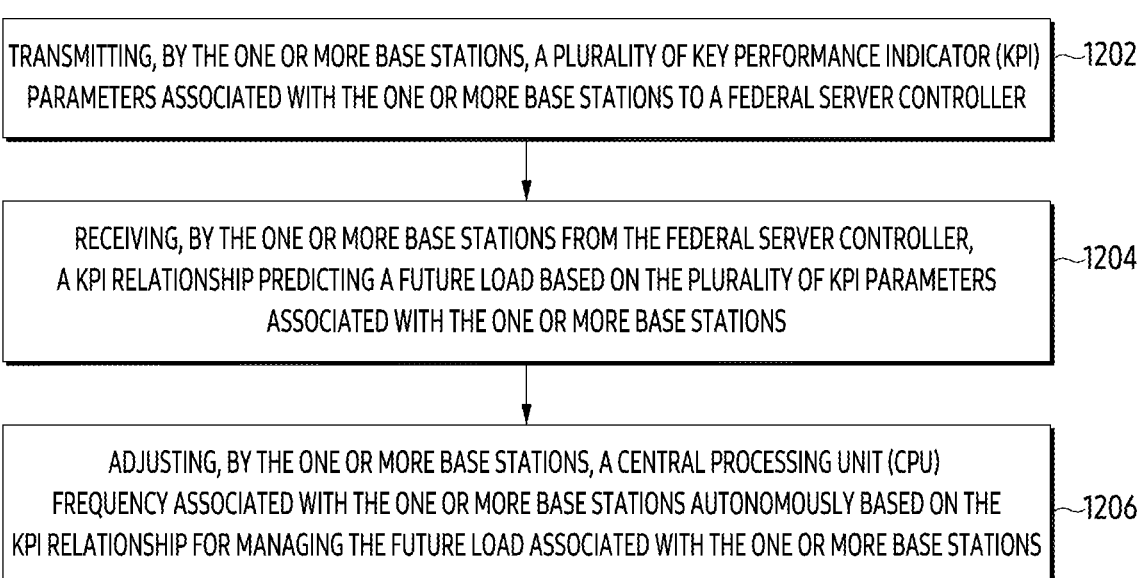

TRANSMITTING, BY THE ONE OR MORE BASE STATIONS, A PLURALITY OF KEY PERFORMANCE INDICATOR (KPI) PARAMETERS ASSOCIATED WITH THE ONE OR MORE BASE STATIONS TO A FEDERAL SERVER CONTROLLER — 1202

RECEIVING, BY THE ONE OR MORE BASE STATIONS FROM THE FEDERAL SERVER CONTROLLER, A KPI RELATIONSHIP PREDICTING A FUTURE LOAD BASED ON THE PLURALITY OF KPI PARAMETERS ASSOCIATED WITH THE ONE OR MORE BASE STATIONS — 1204

ADJUSTING, BY THE ONE OR MORE BASE STATIONS, A CENTRAL PROCESSING UNIT (CPU) FREQUENCY ASSOCIATED WITH THE ONE OR MORE BASE STATIONS AUTONOMOUSLY BASED ON THE KPI RELATIONSHIP FOR MANAGING THE FUTURE LOAD ASSOCIATED WITH THE ONE OR MORE BASE STATIONS — 1206

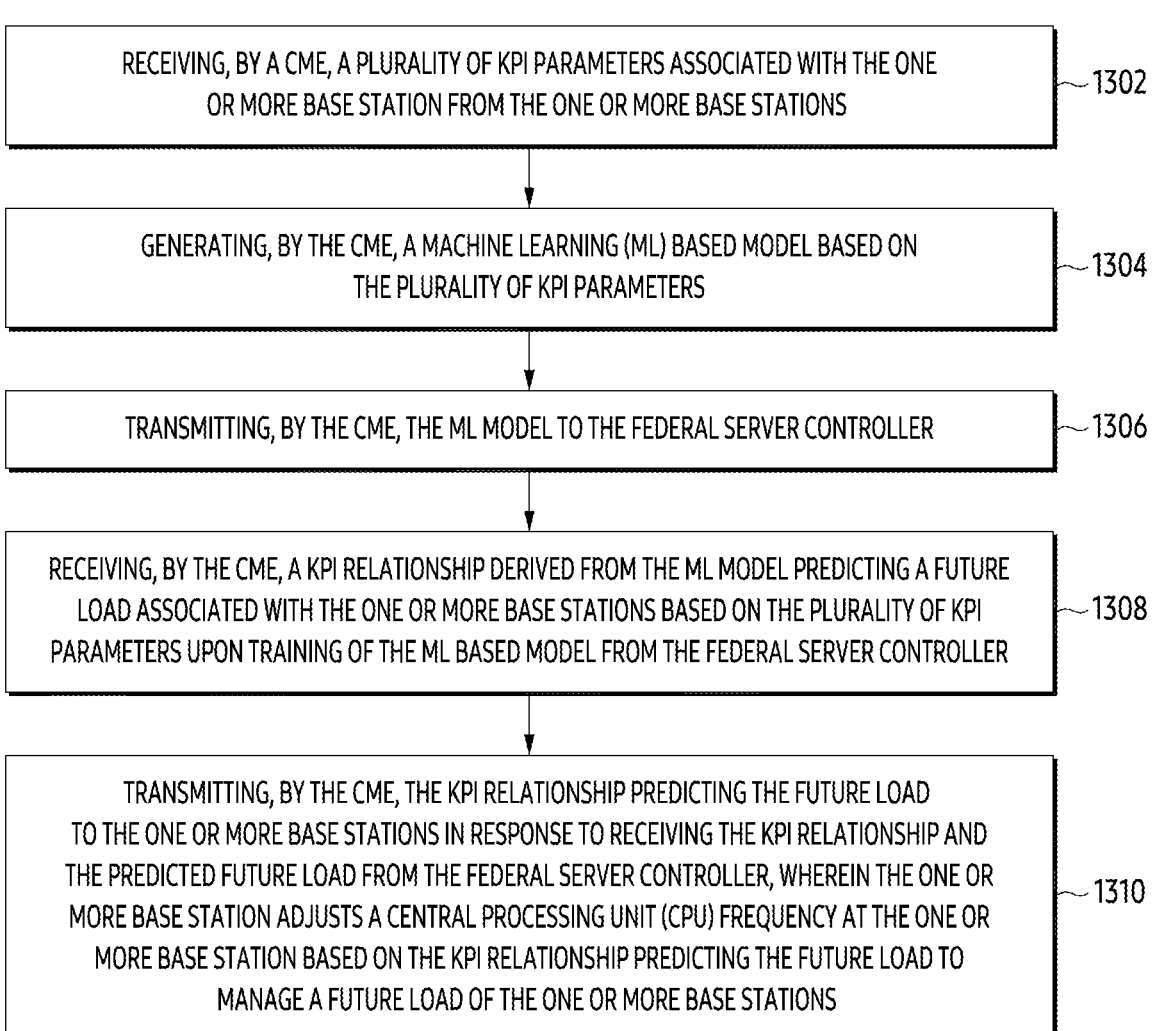

RECEIVING, BY A CME, A PLURALITY OF KPI PARAMETERS ASSOCIATED WITH THE ONE OR MORE BASE STATION FROM THE ONE OR MORE BASE STATIONS ~1302

GENERATING, BY THE CME, A MACHINE LEARNING (ML) BASED MODEL BASED ON THE PLURALITY OF KPI PARAMETERS ~1304

TRANSMITTING, BY THE CME, THE ML MODEL TO THE FEDERAL SERVER CONTROLLER ~1306

RECEIVING, BY THE CME, A KPI RELATIONSHIP DERIVED FROM THE ML MODEL PREDICTING A FUTURE LOAD ASSOCIATED WITH THE ONE OR MORE BASE STATIONS BASED ON THE PLURALITY OF KPI PARAMETERS UPON TRAINING OF THE ML BASED MODEL FROM THE FEDERAL SERVER CONTROLLER ~1308

TRANSMITTING, BY THE CME, THE KPI RELATIONSHIP PREDICTING THE FUTURE LOAD TO THE ONE OR MORE BASE STATIONS IN RESPONSE TO RECEIVING THE KPI RELATIONSHIP AND THE PREDICTED FUTURE LOAD FROM THE FEDERAL SERVER CONTROLLER, WHEREIN THE ONE OR MORE BASE STATION ADJUSTS A CENTRAL PROCESSING UNIT (CPU) FREQUENCY AT THE ONE OR MORE BASE STATION BASED ON THE KPI RELATIONSHIP PREDICTING THE FUTURE LOAD TO MANAGE A FUTURE LOAD OF THE ONE OR MORE BASE STATIONS ~1310

FIG. 13

METHOD AND A SYSTEM FOR POWER MANAGEMENT OF THE ONE OR MORE BASE STATIONS IN A WIRELESS COMMUNICATION NETWORK

CROSS-REFERENCE TO RELATED APPLICATIONS

This application is a continuation of International Application No. PCT/KR2022/015665 designating the United States, filed on Oct. 14, 2022, in the Korean Intellectual Property Receiving Office and claiming priority to Indian Provisional Patent Application No. 202141046922, filed on Oct. 14, 2021, in the Indian Patent Office, and to Indian Complete Patent Application No. 202141046922, filed on Aug. 26, 2022, in the Indian Patent Office, the disclosures of all of which are incorporated by reference herein in their entireties.

BACKGROUND

Field

The disclosure relates to field of networking, and for example, relates to a method and a system for power management of the one or more base stations in a wireless communication network.

Description of Related Art

Traditionally, base-station units such as Distributed Unit (DU), and Radio Unit (RU) are heavy consumers of power. Every wattage saved translates into direct opex (operational expense) savings for an operator. There have been several attempts in the industry to use Artificial Intelligence (AI)/ Machine Learning (ML) methods either on a Central Management Entity (CME) or base-stations to predict lean periods and adjust frequency of the Central Processing Unit (CPU), memory controllers, co-processors, and the like to bring down an amount of power consumed.

If implemented on a CME, Key Performance Indicators (KPI) need to be sent from a base station to the CME for every sampling interval for the ML model. The CME sends back ML based predictions to the base station which leads to scaling issues, given thousands of DUs and delays in propagating frequency adjustment events to DUs, hence loosing on potential opex savings. Sudden spikes in traffic load may not be captured effectively Implementing the above-mentioned technique on a base-station is even more challenging as the base stations run on embedded CPUs, which have limited amount of CPU horse-power, memory capacity, and limited or no support for ML Hardware (HW) acceleration (GPUs). This makes power savings even more difficult to realize on base-stations.

However, a conventional solution discloses a method for controlling power consumption at a base station through dynamic configuration of antenna structures. The method includes monitoring the low usage state of base-station and configuring antenna systems for optimal power consumption accordingly.

Another conventional solution discloses a method for workload prediction based CPU frequency scaling that uses a Virtual Network Function (VNF) historical data to predict future load on system and calculate CPU frequency accordingly.

Both of the above mentioned prior-arts describe using ML or historical data on the device itself to calculate a CPU frequency or an antenna power. This includes several challenges as the base-stations are resource constraint devices (embedded CPU, low memory capacity, no GPU support).

Furthermore, network traffic at base stations often follows a pattern, a time series data depending on user's behaviour. For residential/commercial areas, traffic is off-peak during night-time, whereas airport, railway stations show a different pattern. Even during daytime, there are off peak periods. Base stations/DU CPUs run at a fixed frequency hence consuming same power even when there is low usage. CPUs inside the base station/DU are not deployed with an intelligent Dynamic Voltage Frequency Scaling (DVFS) based power management.

CPU frequency needs to be explicitly updated using a CLI command from Linux Governors. With the time-series data, ML models have been proposed either at base-station or at centralized management station to identify low traffic periods, and update CPU frequency accordingly. However, running such ML models on base-stations is challenging as embedded CPUs which have low CPU frequency, low memory capacity and no ML HW accelerators (GPU). Running ML models on Centralized management stations is definitely feasible. However, periodically updating CPU frequency for thousands of base-stations includes scaling challenges, and often time-sensitive decisions, such as sudden traffic spikes, may be delayed.

There is a need for a solution to overcome the above-mentioned drawbacks.

SUMMARY

In accordance with various example embodiments, a method implemented at one or more base stations for a power management of the one or more base stations in a wireless communication network is disclosed. The method includes: transmitting, by the one or more base stations, a plurality of Key Performance Indicator (KPI) parameters associated with the one or more base stations to a federal server controller; receiving, by the one or more base stations from the federal server controller, a KPI relationship predicting a future load based on the plurality of KPI parameters associated with the one or more base stations; and adjusting, by the one or more base stations, a Central Processing Unit (CPU) frequency associated with the one or more base stations autonomously based on the KPI relationship for managing the future load associated with the one or more base stations.

In accordance with various example embodiments, a method method implemented at a central management entity (CME) for a power management of one or more base stations in a wireless communication network is disclosed. The method includes: receiving, by a CME, a plurality of KPI parameters associated with the one or more base station from the one or more base station; generating, by the CME, a Machine Learning (ML) based model based on the plurality of KPI parameters; transmitting, by the CME, the ML model to a federal server controller; receiving, by the CME, a KPI relationship derived from the ML model predicting a future load associated with the one or more base stations based on the plurality of KPI parameters upon training of the ML based model from the federal server controller; and transmitting, by the CME, the KPI relationship predicting the future load to the one or more base stations in response to receiving the KPI relationship and the predicted future load from the federal server controller, wherein the one or more base station adjusts a Central Processing Unit (CPU) frequency at the one or more base station based on the KPI relationship predicting the future load to manage a future load of the one or more base stations.

In accordance with various example embodiments, a system implemented at one or more base stations for a power management of the one or more base stations in a wireless communication network is disclosed. The system includes: one or more base stations configured to: transmit a plurality of Key Performance Indicator (KPI) parameters associated with the one or more base stations to a federal server controller; receive from the federal server controller, a KPI relationship predicting a future load based on the plurality of KPI parameters associated with the one or more base stations; and adjusting a Central Processing Unit (CPU) frequency associated with the one or more base stations autonomously based on the KPI relationship for managing the future load associated with the one or more base stations.

In accordance with various example embodiments, a system implemented at a central management entity (CME) for a power management of one or more base stations in a wireless communication network is disclosed. The system includes: a CME configured to receive a plurality of KPI parameters associated with the one or more base stations from the one or more base stations; generate a Machine Learning (ML) based model based on the plurality of KPI parameters; transmit the ML model to the federal server controller; receive a KPI relationship derived from the ML model predicting a future load associated with the one or more base stations based on the plurality of KPI parameters upon training of the ML based model from the federal server controller; and transmit the KPI relationship predicting the future load to the one or more base stations in response to receiving the KPI relationship and the predicted future load from the federal server controller, wherein the one or more base station adjusts a Central Processing Unit (CPU) frequency at the one or more base station based on the KPI relationship predicting the future load to manage a future load of the one or more base stations.

These aspects and advantages will be more clearly understood from the following detailed description taken in conjunction with the accompanying drawings and claims.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6A and 6B is a flowchart illustrating an example process for a power management of one or more base stations in a wireless communication network, according to various embodiments;

FIG. 11 is a diagram illustrating example encoding of a KPI relationship at the CME, according to various embodiments;

FIG. 12 is a flowchart illustrating an example method implemented at one or more base stations for a power management of the one or more base stations in a wireless communication network, according to various embodiments; and FIG. 13 is a flowchart illustrating an example method at a CME for a power management of one or more base stations in a wireless communication network, according to various embodiments.

Figure 1A:
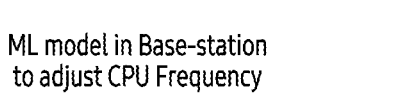
FIG. 1A is a diagram illustrating an existing operational flow diagram depicting a method for a power management of a base station in a wireless communication network, in accordance with the prior art.
Figure 1A:
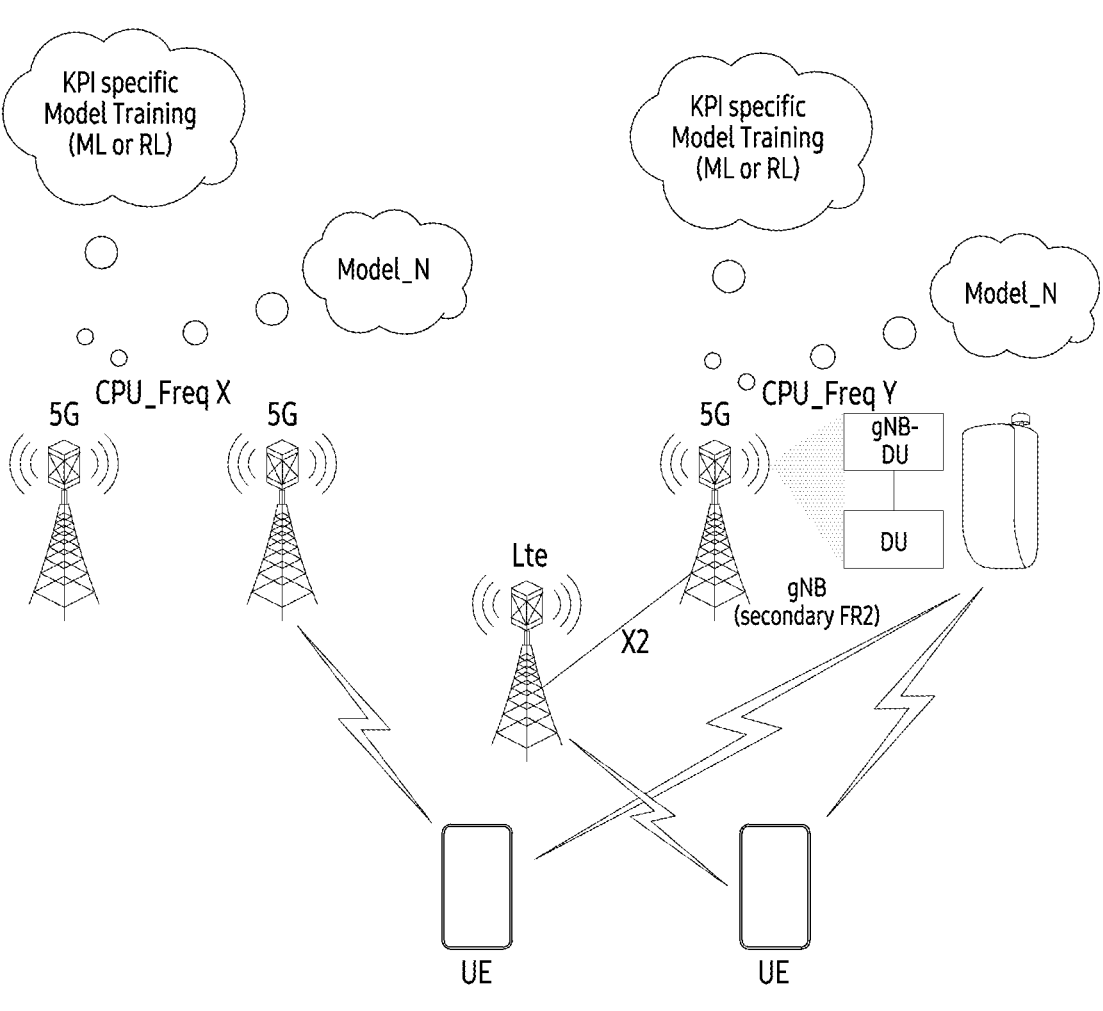

Further, skilled artisans will appreciate that elements in the drawings are illustrated for simplicity and may not have been necessarily drawn to scale. For example, the flowcharts illustrate the system in terms of steps involved to help to improve understanding of aspects of the present disclosure. Furthermore, in terms of the construction of the device, one or more components of the device may have been represented in the drawings by conventional symbols, and the drawings may show those specific details pertinent to understanding the various example embodiments of the present disclosure so as not to obscure the drawings with unnecessary detail.

DETAILED DESCRIPTION

Reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would occur to one skilled in the art.

It will be understood by those skilled in the art that the foregoing general description and the following detailed description are explanatory and are not intended to be restrictive thereof.

Reference throughout the disclosure to "an aspect", "another aspect" or similar language may refer, for example, to a particular feature, structure, or characteristic described in connection with the embodiment being included in the present disclosure. Thus, appearances of the phrase "in an embodiment", "in another embodiment" and similar language throughout the disclosure may, but do not necessarily, all refer to the same embodiment.

The terms "comprises", "comprising", or any other variations thereof, are intended to cover a non-exclusive inclusion, such that a process or system that comprises a list of steps does not include only those steps but may include other steps not expressly listed or inherent to such process or system. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, systems, and examples provided herein are illustrative only and not intended to be limiting.

Embodiments of the disclosure are described below in greater detail with reference to the accompanying drawings.

Figure 1B:
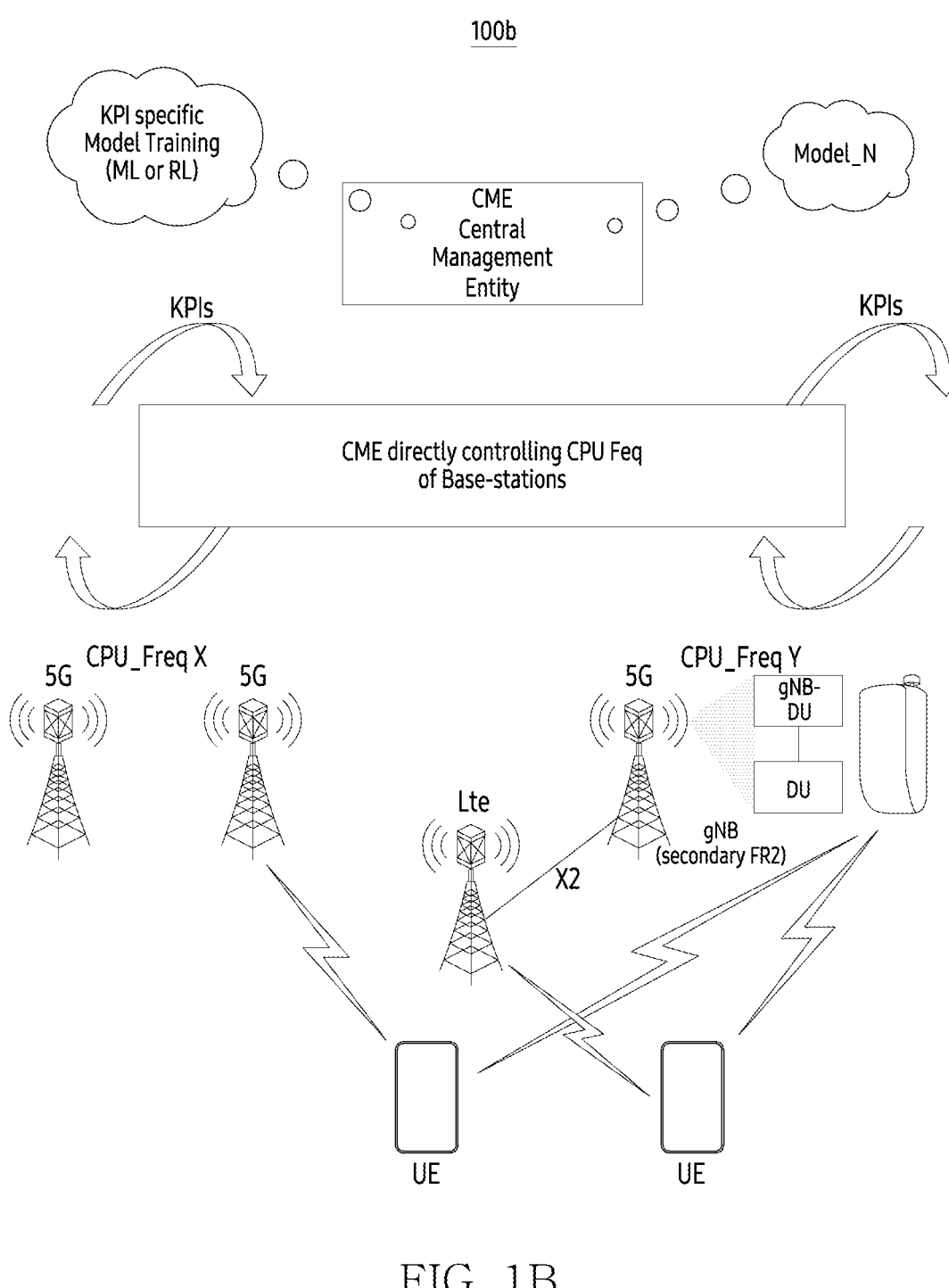
FIG. 1B is a diagram illustrating an existing operational flow diagram depicting a method for a power management of a base station in a wireless communication network, in accordance with the prior art.

FIG. 1A is a diagram illustrating an existing operational diagram depicting an example method 100*a* for a power management of a base station in a wireless communication network, in accordance with the prior art. The base station may be configured to collect a number of KPIs related to the base station and feed the number of KPIs to a ML model. The ML model may be deployed and trained at the base station. The ML model may be configured to predict a frequency related to the base station upon being fed with the number of KPIs. The base station may be configured to apply the predicted frequency at the base station. The predicted frequency is realized faster and there is no dependency on a network congestion or a network load. However, the base station may need a large amount of processing power for a CPU at the base station to perform model training of the ML model. A data plane application in the base station may run in a tight loop polling for data packets, with 99-100% CPU utilization, making it difficult for external linux applications like Linux kernel/governor to identify real CPU idle cycles, mentioned below:

core load=(busy cycles/(idle cycles+busy cycles)
idle cycles=no data period
busy cycle=core is processing the packet FIG. 1B is a diagram illustrating an example method 100*b* for a power management of a base station in a wireless communication network, in accordance with the prior art. The base station may be configured to transmit the number of KPIs to a CME upon collection of the number of KPIs. The CME may be configured to train the ML model and predict the frequency at the CME. Further, the CME may be configured to transmit the predicted frequency to the base station. The base station may be configured to apply the predicted frequency at the base station. The base station may not go through a large amount of power consumption as the ML model is trained at the CME, the CME may be located in an edge cloud. However, the method 100*b* includes a number of drawbacks:

a. Realization of results may be slower and dependent on the network congestion, and the network load.
b. The method 100*b* may not be easily scalable if there are huge number of base stations under each CME.
c. The base stations may not be able to handle sudden spikes due to scaling delays from the CME.

Figure 2:
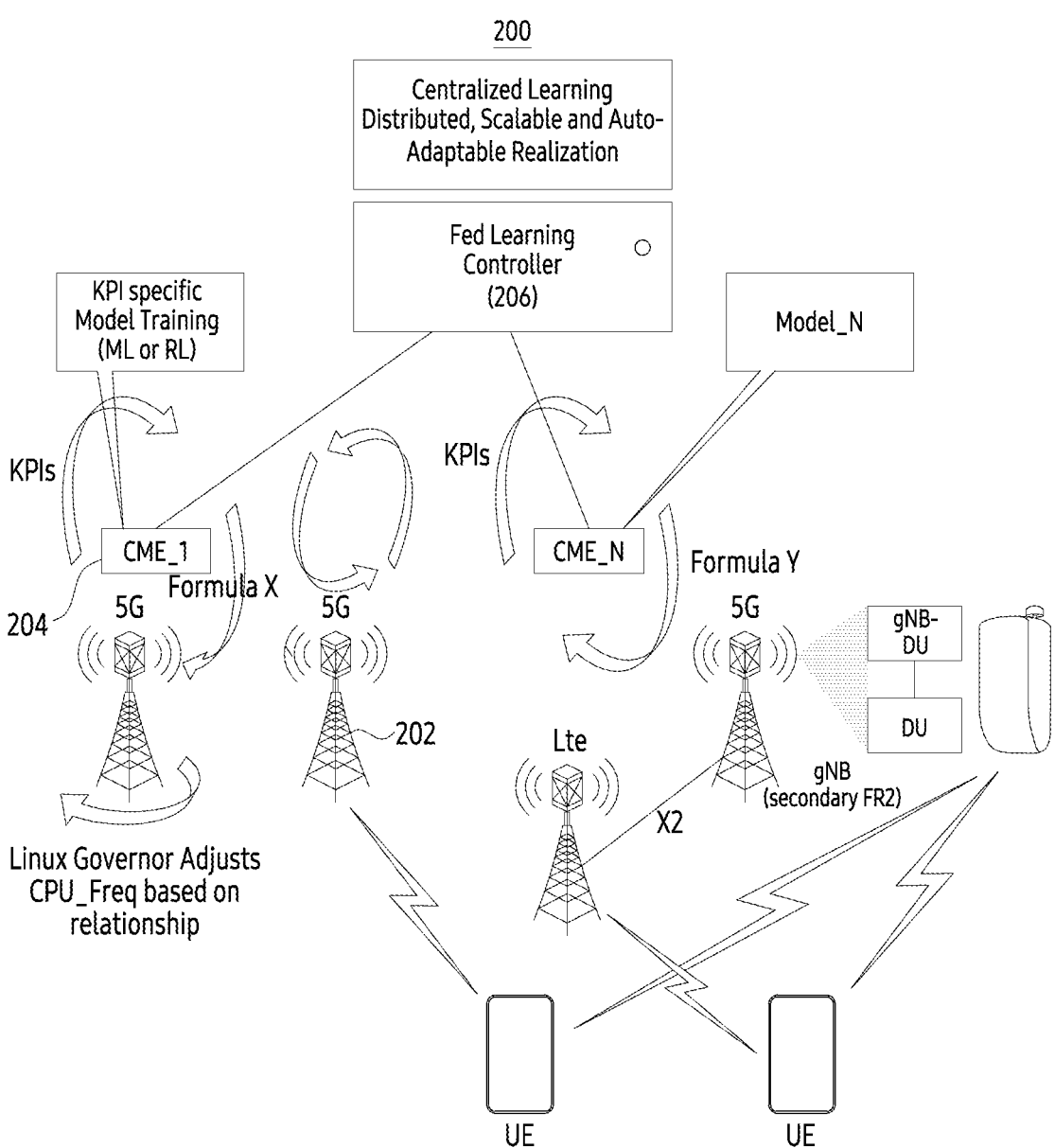
FIG. 2 is a diagram illustrating an example environment for a power management of one or more base stations in a wireless communication network, according to various embodiments.

FIG. 2 is a diagram illustrating an environment 200 for a power management of one or more base stations 202 in a wireless communication network, according to various embodiments. The environment 200 includes the one or

Figure 3:
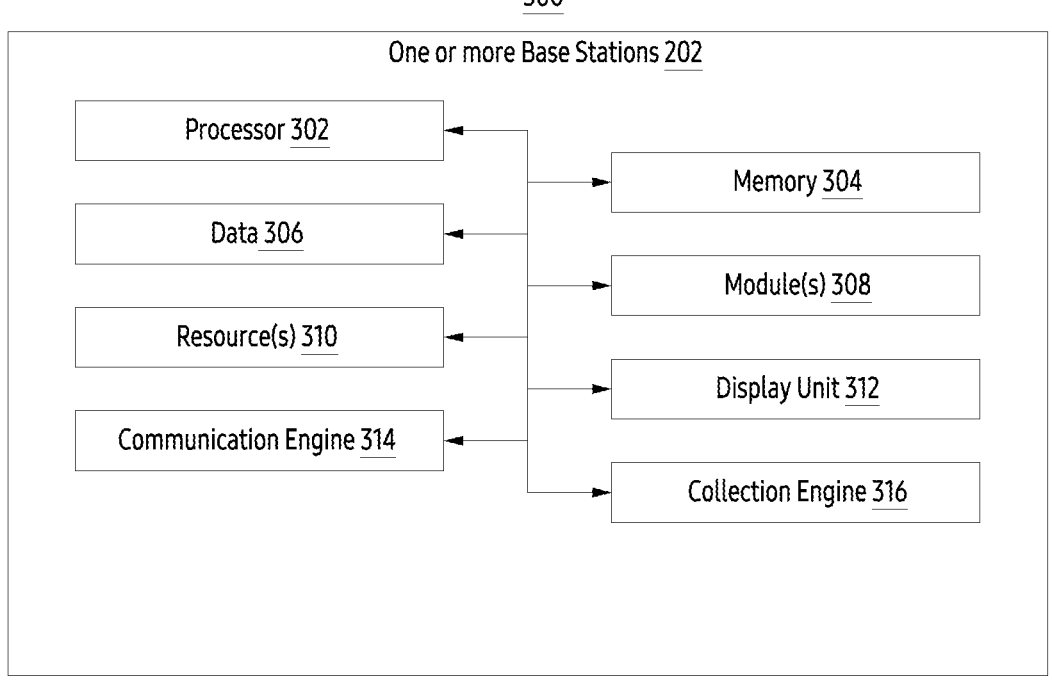
FIG. 3 is a block diagram illustrating an example configuration of one or more base stations, according to various embodiments.

6 more base stations 202 (refer to FIG. 3_, a CME 204, and a federal server controller 206. The one or more base stations 202 may be in a two-way communication with the CME 204, and the CME 204 may be in a two-way communication with both of the one or more base stations 202 and the federal server controller 206. The power management may be performed in order to save an amount of power consumed by the one or more base stations 202.

According to the various aspects of the disclosure, the one or more base stations 202 may be configured to transmit a number of Key Performance Indicator (KPI) parameters to the federal server controller 206. The number of KPIs may be related to the one or more base stations 202. The one or more base stations 202 may be configured to transmit the number of KPIs to the federal server controller via the CME 204. For example, the one or more base stations 202 may be configured to transmit the number of KPIs to the CME 204.

The CME 204 in response to receiving the number of KPI parameters may be configured to generate a ML based model. The ML based model may be generated based on the number of KPI parameters. Further, the CME 204 may be configured to transmit the ML based model to the federal server controller 204. The CME 204 may be configured to receive a KPI relationship derived from the ML model from the federal server controller 206. The KPI relationship may be configured to predict a future load associated with the one or more base stations based on the number of KPI parameters upon training of the ML based model from the federal server controller 206.

In response to receiving the KPI relationship and the predicted load from the federal server controller 206, the CME 204 may be configured to transmit the KPI relationship predicting the future load to the one or more base stations 202. The one or more base stations 202 may be configured to receive the KPI relationship predicting the future load based on the number of KPI parameters related to the one or more base stations 202 from the CME 204.

The one or more base stations 202 may be configured to adjust a CPU frequency related to the one or more base stations 202 autonomously. The adjustment may be performed based on the KPI relationship for managing the future load associated with the one or more base stations 202.

FIG. 3 is a block diagram 300 illustrating an example configuration of one or more base stations, according to various embodiments. The one or more base stations may be the one or more base stations 202 as referred in FIG. 2. The one or more base stations 202 may be configured to communicate with the federal server controller 206 via the CME 204 as referred in FIG. 2 for receiving a KPI relationship and a predicted load related to the one or more base stations 202. The KPI relationship may be a mathematical function based on a number of KPI parameters related to the one or more base stations 202 generated by the federal server controller 206. The KPI relationship and the predicted future load may be utilised for managing a future load related to the one or more base stations 202.

Each of the one or more base stations 202 may include a processor (e.g., including processing circuitry) 302, a memory 304, data 306, module(s) (e.g., including various processing circuitry and/or executable program instructions) 308, resource(s) 310, a display unit (e.g., including a display) 312, a communication engine (e.g., including communication circuitry) 314, and a collection engine (e.g., including various circuitry) 316. In an embodiment, the processor 302, the memory 304, the data 306, the module (s) 308, the resource (s) 310, the display unit 312, the communication engine 314, and the collection engine 316 may be communicatively coupled to one another.

As would be appreciated, the one or more base stations 202, may be understood as one or more of a hardware, a software, a logic-based program, a configurable hardware, and the like. In an example, the processor 302 may be a single processing unit or a number of units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may be configured to fetch and/or execute computer-readable instructions and/or data stored in the memory 304.

In an example, the memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 304 may include the data 306. The data 306 serves, amongst other things, as a repository for storing data processed, received, and generated by one or more of the processor 302, the memory 304, the data 306, the module (s) 308, the resource (s) 310, the display unit 312, the communication engine 314, and the collection engine 316.

The module(s) 308, amongst other things, may include routines, programs, objects, components, data structures, etc., which perform particular tasks or implement data types. The module(s) 308 may also be implemented as, signal processor(s), state machine(s), logic circuitries, and/or any other device or component that manipulate signals based on operational instructions.

Further, the module(s) 308 may be implemented in hardware, as instructions executed by at least one processing unit, e.g., processor 302, or by a combination thereof. The processing unit may be a general-purpose processor that executes instructions to cause the general-purpose processor to perform operations or, the processing unit may be dedicated to performing the required functions. In another aspect of the present subject matter, the module(s) 308 may be machine-readable instructions (software) which, when executed by a processor/processing unit, may perform any of the described functionalities.

In various example embodiments, the module(s) 308 may be machine-readable instructions (software) which, when executed by a processor 302/processing unit, perform any of the described functionalities.

The resource(s) 310 may be physical and/or virtual components of the one or more base stations 202 that provide inherent capabilities and/or contribute towards the performance of the one or more base stations 202. Examples of the resource(s) 310 may include, but are not limited to, a memory (e.g., the memory 304), a power unit (e.g., a battery), a display unit (e.g., the display unit 312) etc. The resource(s) 310 may include a power unit/battery unit, a network unit, etc., in addition to the processor 302, and the memory 304.

The display unit 312 may include a display and display various types of information (for example, media contents, multimedia data, text data, etc.) to the one or more base stations 202. The display unit 312 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the communication engine 314 and the collection engine 316, amongst other things, include routines, programs, objects, components, data structures, etc., which perform particular tasks or implement data types. The communication engine 314 and the collection engine 316 may also be implemented as, signal processor(s), state machine(s), logic circuitries, and/or any other device or component that manipulate signals based on operational instructions. Further, the communication engine 314, and the collection engine 316 can be implemented in hardware, instructions executed by a processing unit, or by a combination thereof. The processing unit can comprise a computer, a processor, such as the processor 302, a state machine, a logic array or any other suitable devices capable of processing instructions. The processing unit can be a general-purpose processor which executes instructions to cause the general-purpose processor to perform the required tasks or, the processing unit can be dedicated to performing the required functions.

The collection engine 316 incorporated in each of the one or more base stations 202 may be configured to collect the number of KPI parameters related to each of the one or more base stations 202. The collection engine 316 may be configured to collect the number of KPI parameters from one or more E2 nodes and an O-cloud associated with the one or more base stations 202. The number of KPI parameters may be collected in a periodic manner. In an example embodiment, the number of KPI parameters may be collected after a predetermined amount of time. The number of KPI parameters may be time-series data coming out of each gNB/eNBs. Examples of the number of KPI parameters may include, but are not limited to, at least one of an average load, a CPU Frequency, a downlink throughput, an uplink throughput, a number of User Equipment (UE) connected to the one or more base stations, a maximum throughput associated with the one or more base stations, an average number of UE connected to the one or more base stations, a maximum number of UE connected to the one or more base stations, an average CPU usage, an average memory usage, a maximum memory usage, a minimum memory usage, an average Solid State Drive (SSD) usage, a maximum SSD usage, and a minimum SSD usage.

The processor 302 may be configured to determine whether a value related to each KPI parameter amongst the number of KPI parameters is greater than a respective threshold value associated with each KPI parameter amongst the number of KPI parameters or not. In an embodiment, where it is determined that the value related to each KPI parameter is greater than the respective threshold value, the communication engine 314 may be configured to transmit the number of KPI parameters to the federal server controller 206 as referred in FIG. 2. The transmission of the number of KPI parameters may be performed via the CME 204 as referred in FIG. 2 such that the CME 204 may be configured to receive the number of KPI parameters and the federal server controller 206 may be configured to receive the number of KPI parameters from the CME 204.

In response to transmission of the number of KPI parameters by the communication engine 314, the communication engine 314 may be configured to receive the KPI relationship predicting the future load from the deferral server controller 206. The KPI relations may be based on the number of KPI parameters related to the one or more base stations 202.

The processor 302 may be configured to adjust a CPU frequency related to the one or more base stations 202 autonomously based on the KPI relationship. The adjustment may be performed for managing the future load associated with the one or more base stations 202. The processor 302 may be configured to adjust the CPU frequency by applying the KPI relationship at the one or more base stations 202. The KPI relationship may be applied through a CPU governor associated with the one or more base stations. The CPU governor may be a Linux Governor through which the KPI relationship may be realized at the one or more base stations 202. The Linux Governor may be configured to collect the number of KPI from the KPI relationship and a core frequency may be derived from the number of KPI parameters. The core frequency may be allowed only in steps such as 1.2 GHz, 1.3 GHz, . . . 1.8 GHz. The core frequency may be set to a next bigger allowed frequency. The selected core frequency may be set using a space governor via a sysfs mechanism by a program/ script.

executable program instructions) 416, and a performance analyzer (e.g., including various processing circuitry and/or executable program instructions) 418. In an embodiment, the processor 402, the memory 404, the data 406, the module(s) 408, the resource(s) 410, the display unit 412, the communication engine 414, the generation engine 416, and the performance analyzer 418 may be communicatively coupled to one another.

The CME 204, may be understood as one or more of a hardware, a software, a logic-based program, a configurable hardware, and the like. In an example, the processor 402 may be a single processing unit or a number of units, all of which could include multiple computing units. The processor 402 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 402 may be configured to fetch and/or execute computer-readable instructions and/or data stored in the memory 404.

TABLE 1

| Command & Output | Description |
| --- | --- |
| # cat/sys/devices/system/cpu/cpufreq/policy0/ scaling_governor Performance | Multiple governors are supported in Linux (Performance, Powersave, Userspace, Ondemand, Conservative and Schedutil). Current governor is Performance |
| # echo userspace >/sys/devices/system/cpu/ cpufreq/policy0/scaling governor | Set the governor to Userspace so that application/script can set the operating frequency |
| # cat/sys/devices/system/cpu/cpufreq/policy0/ scaling_cur_freq 1800000 | Current core frequency is displayed in KHz. In this example current core frequency is 1.8 GHz |
| # echo 1200000 >/sys/devices/system/cpu/ cpufreq/policy0/scaling_setspeed | Set core frequency. In this example core frequency is being set to 1.2 GHz |
| # cat/sys/devices/system/cpu/cpufreq/ policy0/scaling_cur_freq 1200000 | Current core frequency is displayed in KHz. In this example current core frequency is 1.2 GHz |

Figure 4:
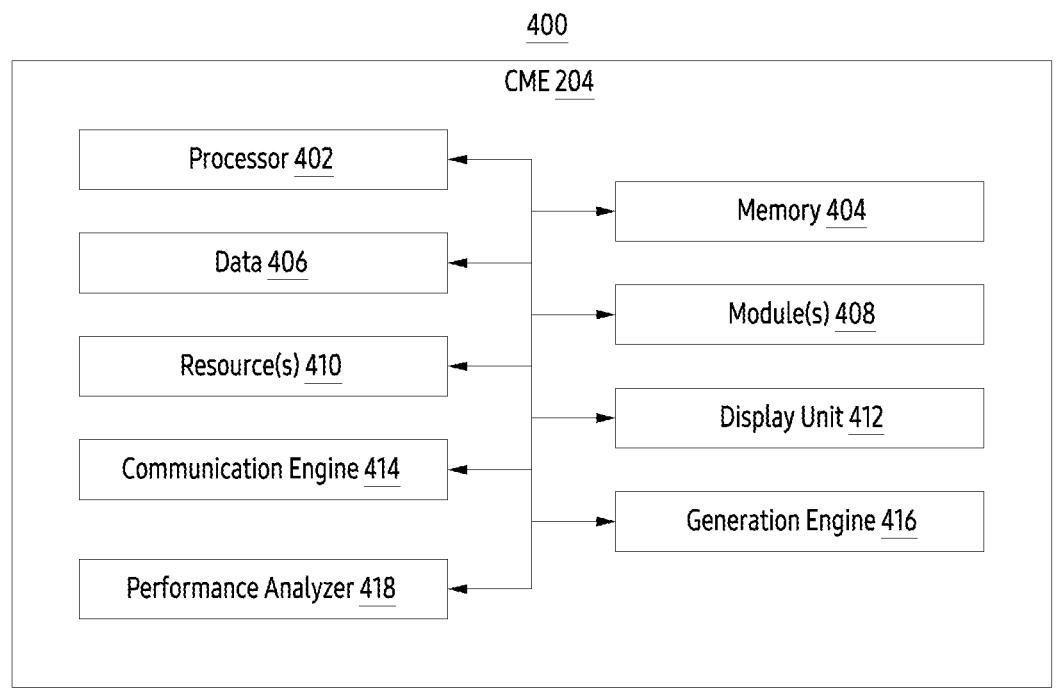
FIG. 4 illustrates a schematic block diagram of a CME, in accordance with an embodiment of the present subject matter.

FIG. 4 is a block diagram 400 illustrating an example configuration of a CME 204, according to various embodiments. The CME may be the CME 204 as referred in FIG. 2. Examples of the CME 204 may include, but are not limited to, a Long-Term Evolution System Manager (LSM), a Unified System Manager (USM). The CME 204 may be configured to manage an amount of power consumed by the one or more base stations 202 communicating with the CME 204. The CME 202 may be configured to use a CPU horsepower related to the CME 204 to derive a KPI relationship such as a mathematical model predicting a future load based on a number of KPI parameters related to the one or more base stations 202. The CME 204 may be configured to derive the KPE relationship using a federated learning. The CME 204 may be configured to train a ML based model and communicate with the federal server controller 206 as referred in FIG. 2 for deriving the KPI relationship predicted the future load. Further, the KPI relationship may be applied at the one or more base stations 202 for managing the future load related to the one or more base stations 202.

The CME 204 may include a processor (e.g., including processing circuitry) 402, a memory 404, data 406, module (s) (e.g., including various circuitry and/or program instructions) 408, resource(s) (e.g., including various circuitry and/or executable program instructions) 410, a display unit (e.g., including a display) 412, a communication engine (e.g., including communication circuitry) 414, a generation engine (e.g., including various processing circuitry and/or In an example, the memory 404 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 404 may include the data 406. The data 406 serves, amongst other things, as a repository for storing data processed, received, and generated by one or more of the processor 402, the memory 404, the data 406, the module (s) 408, the resource (s) 410, the display unit 412, the communication engine 414, the generation engine 416, and the performance analyzer 418.

The module(s) 408, amongst other things, may include routines, programs, objects, components, data structures, etc., which perform particular tasks or implement data types. The module(s) 408 may also be implemented as, signal processor(s), state machine(s), logic circuitries, and/or any other device or component that manipulate signals based on operational instructions.

Further, the module(s) 408 may be implemented in hardware, as instructions executed by at least one processing unit, e.g., processor 402, or by a combination thereof. The processing unit may be a general-purpose processor that executes instructions to cause the general-purpose processor to perform operations or, the processing unit may be dedicated to performing the required functions. In another aspect of the present subject matter, the module(s) 408 may be machine-readable instructions (software) which, when executed by a processor/processing unit, may perform any of the described functionalities.

In various example embodiments, the module(s) 408 may be machine-readable instructions (software) which, when executed by a processor 402/processing unit, perform any of the described functionalities.

The resource(s) 410 may be physical and/or virtual components of the CME 204 that provide inherent capabilities and/or contribute towards the performance of the CME 204. Examples of the resource(s) 410 may include, but are not limited to, a memory (e.g., the memory 404), a power unit (e.g., a battery), a display unit (e.g., the display unit 412) etc. The resource(s) 410 may include a power unit/battery unit, a network unit, etc., in addition to the processor 402, and the memory 404.

The display unit 412 may include a display and display various types of information (for example, media contents, multimedia data, text data, etc.) to the CME 204. The display unit 412 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the communication engine 414, the generation engine 416, and the performance analyzer 418 amongst other things, include routines, programs, objects, components, data structures, etc., which perform particular tasks or implement data types. The communication engine 414, the generation engine 416, and the performance analyzer 418 may also be implemented as, signal processor(s), state machine(s), logic circuitries, and/or any other device or component that manipulate signals based on operational instructions. Further, the communication engine 414, the generation engine 416, and the performance analyzer 418 can be implemented in hardware, instructions executed by a processing unit, or by a combination thereof. The processing unit can comprise a computer, a processor, such as the processor 402, a state machine, a logic array or any other suitable devices capable of processing instructions. The processing unit can be a general-purpose processor which executes instructions to cause the general-purpose processor to perform the required tasks or, the processing unit can be dedicated to performing the required functions.

Continuing with the above embodiment, the communication engine 414 may be configured to receive the number of KPI parameters related to the one or more base stations 202 from the one or more base stations 202. The communication engine 414 may be configured to receive the number of KPI parameters in a periodic manner. Examples of the number of KPI parameters may include, but are not limited to, at least one of an average load, a CPU Frequency, a downlink throughput, an uplink throughput, a number of UE connected to the one or more base stations, a maximum throughput associated with the one or more base stations, an average number of UE connected to the one or more base stations, a maximum number of UE connected to the one or more base stations, an average CPU usage, an average memory usage, a maximum memory usage, a minimum memory usage, an average SSD usage, a maximum SSD usage, and a minimum SSD usage.

In response to receiving the number of KPI parameters by the communication engine 414, the generation engine 416 may be configured to generate the ML based model based on the number of KPI parameters. The ML based model may be trained by the generation engine 416 with the number of KPI parameters related to the one or more base stations 202. Subsequently, the communication engine 414 may be configured to transmit the ML based model to the federal server controller 206.

The communication engine 414 may be configured to receive from the federal server controller 206 a KPI relationship derived from the ML model predicting a future load related to the one or more base stations based on the number of KPI parameters upon training of the ML based model. The KPI relationship may include at least one of one or more variables, one or more co-efficient, and one or more operators on the one or more variables. Examples of the one or more variables may include, but are not limited to, an addition operator (+), a subtraction operator (−), a multiplication operator (*), a division operator (/), and an exponential operator as depicted in table 2 below. Further, examples of the one or more variables may include, but are not limited to, an average load, the downlink throughput, the uplink throughput, a number of connected RRC users, a load, a frequency, and an average downlink throughput as depicted in table 3 below.

TABLE 2 depicts the one or more operators, a description and a value related to the one or more operators

| Operator | Description | Value |
|---|---|---|
| + | Add | 000 |
| − | Subtract | 001 |
| * | Multiply | 010 |
| / | Divide | 011 |
| power | Exponential | 100 |

TABLE 3

| Variable | Description | Value |
|---|---|---|
| avgLoad | Average load | 000 |
| DLRX | Downlink throughput | 001 |
| ULRX | Uplink throughput | 010 |
| Connected RRC users | Connected RRC users | 011 |
| Load | Load | 100 |
| Freq | Frequency | 101 |
| avgDLRX | Average downlink throughput | 110 |

The performance analyser 418 may be configured to analyse the KPI relationship received from the federal server controller 206. The analysis may be performed based on an accuracy, a computational complexity, a past prediction record, and the number of KPI parameters. Subsequently, the processor 402 may be configured to encode the KPI relationship. Encoding the KPI relationship may be based on applying an encoding technique on the one or more variables and the one or more operators in the KPI relationship. Examples of the encoding technique may include, but are not limited to, a Huffman code technique. The encoding of the one or more variables and the one or more operators may be pre-populated on the CME 204 and the one or more base stations 202 for an easy translation.

In response to encoding the KPI relationship by the processor 402, the communication engine 416 may be configured to transmit the KPI relationship predicting the future load to the one or more base stations 202. The one or more base station may be configured to adjust a CPU frequency at the one or more base stations 202 based on the KPI relationship predicting the future load to manage a future load of the one or more base stations 202.

Figure 5:
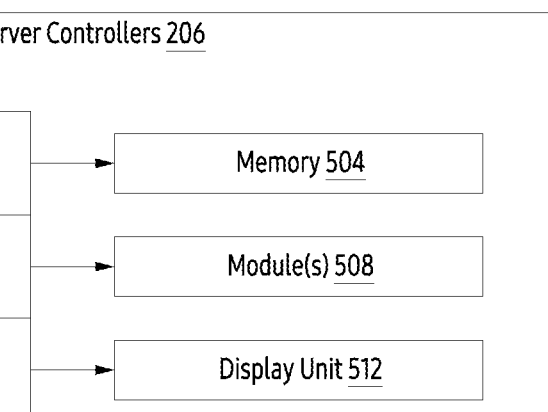
FIG. 5 is a block diagram illustrating an example configuration of a federal server controller, according to various embodiments.

FIG. 5 of a schematic block diagram 500 of a federal server controller 206, according to various embodiments. The federal server controller may be the federal server controller 206 as referred in FIG. 2. The federal server controller 206 may be configured to train a ML based model received from the CME 204 as referred in FIG. 2 to generate a KPI relationship predicting a future load related to the one or more base stations 202. The KPI relationship may be generated in order to manage an amount of power consumed by the one or more base stations 202. The KPI relationship may be generated based on the ML based model and the number of KPI parameters related to the one or more base stations. The KPI relationship may be unique for each base station amongst the one or more base stations 202 to match a traffic pattern related to each gNB/eNB in the one or more base stations 202 such that the KPI relationship may be specific to each gNB/eNB to address load conditions related to the one or more base stations 202.

Examples of the number of KPI parameters may include, but are not limited to, at least one of an average load, a CPU Frequency, a downlink throughput, an uplink throughput, a number of UE connected to the one or more base stations, a maximum throughput associated with the one or more base stations, an average number of UE connected to the one or more base stations, a maximum number of UE connected to the one or more base stations, an average CPU usage, an average memory usage, a maximum memory usage, a minimum memory usage, an average SSD usage, a maximum SSD usage, and a minimum SSD usage.

The federal server controller 206 may include a processor (e.g., including processing circuitry) 502, a memory 504, data 506, module(s) (e.g., including various circuitry and/or executable program instructions) 508, resource(s) (e.g., including various circuitry and/or executable program instructions) 510, a display unit (e.g., including a display) 512, a communication engine (e.g., including communication circuitry) 514, and a generation engine (e.g., including various processing circuitry and/or executable program instructions) 516. In an embodiment, the processor 502, the memory 504, the data 506, the module (s) 508, the resource (s) 510, the display unit 512, the communication engine 514, and the generation engine 516 may be communicatively coupled to one another.

The federal server controller 206, may be understood as one or more of a hardware, a software, a logic-based program, a configurable hardware, and the like. In an example, the processor 502 may be a single processing unit or a number of units, all of which could include multiple computing units. The processor 502 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 502 may be configured to fetch and/or execute computer-readable instructions and/or data stored in the memory 504.

In an example, the memory 504 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 504 may include the data 506. The data 506 serves, amongst other things, as a repository for storing data processed, received, and generated by one or more of the processor 502, the memory 504, the data 506, the module (s) 508, the resource (s) 510, the display unit 512, the communication engine 514, and the generation engine 516.

The module(s) 508, amongst other things, may include routines, programs, objects, components, data structures, etc., which perform particular tasks or implement data types. The module(s) 508 may also be implemented as, signal processor(s), state machine(s), logic circuitries, and/or any other device or component that manipulate signals based on operational instructions.

Further, the module(s) 508 may be implemented in hardware, as instructions executed by at least one processing unit, e.g., processor 502, or by a combination thereof. The processing unit may be a general-purpose processor that executes instructions to cause the general-purpose processor to perform operations or, the processing unit may be dedicated to performing the required functions. In another aspect of the present subject matter, the module(s) 508 may be machine-readable instructions (software) which, when executed by a processor/processing unit, may perform any of the described functionalities.

In various example embodiments, the module(s) 508 may be machine-readable instructions (software) which, when executed by a processor 502/processing unit, perform any of the described functionalities.

The resource(s) 510 may be physical and/or virtual components of the federal server controller 206 that provide inherent capabilities and/or contribute towards the performance of the federal server controller 206. Examples of the resource(s) 510 may include, but are not limited to, a memory (e.g., the memory 504), a power unit (e.g., a battery), a display unit (e.g., the display unit 512) etc. The resource(s) 510 may include a power unit/battery unit, a network unit, etc., in addition to the processor 502, and the memory 504.

The display unit 512 may include a display and display various types of information (for example, media contents, multimedia data, text data, etc.) to the federal server controller 206. The display unit 512 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the communication engine 514 and the generation engine 516, amongst other things, include routines, programs, objects, components, data structures, etc., which perform particular tasks or implement data types. The communication engine 514 and the generation engine 516 may also be implemented as, signal processor(s), state machine(s), logic circuitries, and/or any other device or component that manipulate signals based on operational instructions. Further, the communication engine 514, and the generation engine 516 can be implemented in hardware, instructions executed by a processing unit, or by a combination thereof. The processing unit can comprise a computer, a processor, such as the processor 502, a state machine, a logic array or any other suitable devices capable of processing instructions. The processing unit can be a general-purpose processor which executes instructions to cause the general-purpose processor to perform the required tasks or, the processing unit can be dedicated to performing the required functions.

The communication engine 514 may be configured to receive the ML based model trained with the number of KPI parameters from the CME 204.

The processor 502 may be configured to identify a CPU core load, one or more correlated KPI parameters amongst the number of KPI parameters, and one or more conditions from the ML based model. Examples of the one or more conditions may include, but are not limited to, the number of KPI parameters related to the one or more base stations is collected at a previous time stamp, a value of a loss is low while deriving the KPI relationship to increase an accuracy of the KPI relationship such that RMSE may be low, and a computational complexity of the KPI relationship to be derived is low such as a minimize log, exponents, higher degree powers.

Upon identification of the CPU core load, the one or more correlated KPI parameters amongst the number of KPI parameters, and the one or more conditions, the processor 502 may be configured to pre-process the number of KPI parameters to filter one or more irregularities in the plurality of KPI parameters. In response to pre-processing, the processor 502 may be configured to quantify a correlation between the one or more correlated KPI parameters amongst the plurality of KPI parameters. Further, the processor 502 may be configured to initialize an approximate KPI relationship. The approximate KPI relationship may be initialized based on the CPU core load, the one or more correlated KPI parameters amongst the number of KPI parameters, and the one or more conditions. A methodology to estimate the KPI relationship is illustrated by way of non-limiting example below:

1. Initialize KPI relationship F coefficients C
2. for i=1, 2, . . . , N do
3. $C_{tuned}$=Curve Fitting (F,C)
4. If |real data−(F with coefficients $C_{tuned}$)|>accepted accuracy then change the KPI relationship F and reinitialize coefficients C
5. Else return final KPI relationship $F_{final}$=F with coefficients $C_{tuned}$
6. end for The processor 502 may be configured to perform a curve fitting through a regression to derive the KPI relationship. The curve fitting may include adjusting the approximate KPI relationship to perform a number of iterations for deriving the KPI relationship. The curve fitting may include employing a ML technique to derive the KPI relationship. The KPI relationship as depicted in an equation 1 may include one or more coefficients, one or more variables and one or more operators related to the one or more variables. The regression may be one of a linear regression, a power regression, and an exponent regression. The KPI relationship may be depicted in the equation 1 below:

$$Load_i = b. \, avgLoad_{i-1} \, +$$
$$c. \, Freq_{i-1}^3 + d. \, Freq_{i-1} + g. \, DLRX_{i-1} \cdot avgDLRX_{i-1} + h$$
$$\text{Where } avgLoad_n = \frac{\sum_{n-5}^{n} Load_n}{5} \text{ and } avgDLRX_n = \frac{\sum_{n-5}^{n} DLRX_n}{5}$$
$$\text{where the coefficients are:}$$
$$b = 9.95668695e\text{−}01, \, c = 8.41721118e\text{−}02,$$
$$d = \text{−}5.55968367e\text{−}01, \, g = 8.77631512e\text{−}16, \, h = 7.20115522e\text{−}01$$

Furthermore, the regression may be performed to generate a regression function with a smooth curve that may be designed stay as close as possible to data points in a "holistic" sense to be made precise. Further, the regression may be configured to allow an interpolation and an extrapolation of data by choosing a test value of an independent variable, and substituting the test value into the regression function, and using a result to estimate a corresponding value of a dependent variable.

Regression functions may allow one to interpolate and extrapolate data by choosing some test value of the independent variable, substituting it into a model for the regression function, and using the result to estimate the corresponding value of the dependent variable.

In an embodiment, "N" may denote a number of distinct values of the independent variable within a dataset. Further, a number of parameters in a class of functions being used to fit the data may not exceed N.

The processor 502 may be configured to modify the KPI relationship based on one or more observations. Modifying the KPI relationship may include changing one or more terms related to the KPI relationship. Further, the processor 502 may be configured to calculate an accuracy of the KPI relationship upon performing the curve fitting on the KPI relationship. In an embodiment, where it is determined that the accuracy is low, the KPI relationship is changed, and the one or more coefficients are reinitialized. Further, when the accuracy is not low, the KPI relationship may be tuned with the one or more coefficients.

The processor 502 may be configured to analyse the KPI relationship based on the accuracy, the computational complexity, a past prediction record, and the number of KPI parameters.

TABLE 4

| KPI | Description |
| --- | --- |
| $Load_i$ | Predicted Load |
| $avgLoad_{i-1}$ | Average core load at time i − 1 |
| $Freq_{i-1}$ | Operating Frequency at time i − 1 |
| $DLRX_{i-1}$ | DL Rx TP at time i − 1 |
| $avgDLRX_{i-1}$ | Moving average of DL RX at time i − 1 |

Further, the communication engine 514 may be configured to transmit the KPI relationship predicting the future load to the one or more base stations 202 via the CME 204.

Figure 6B:
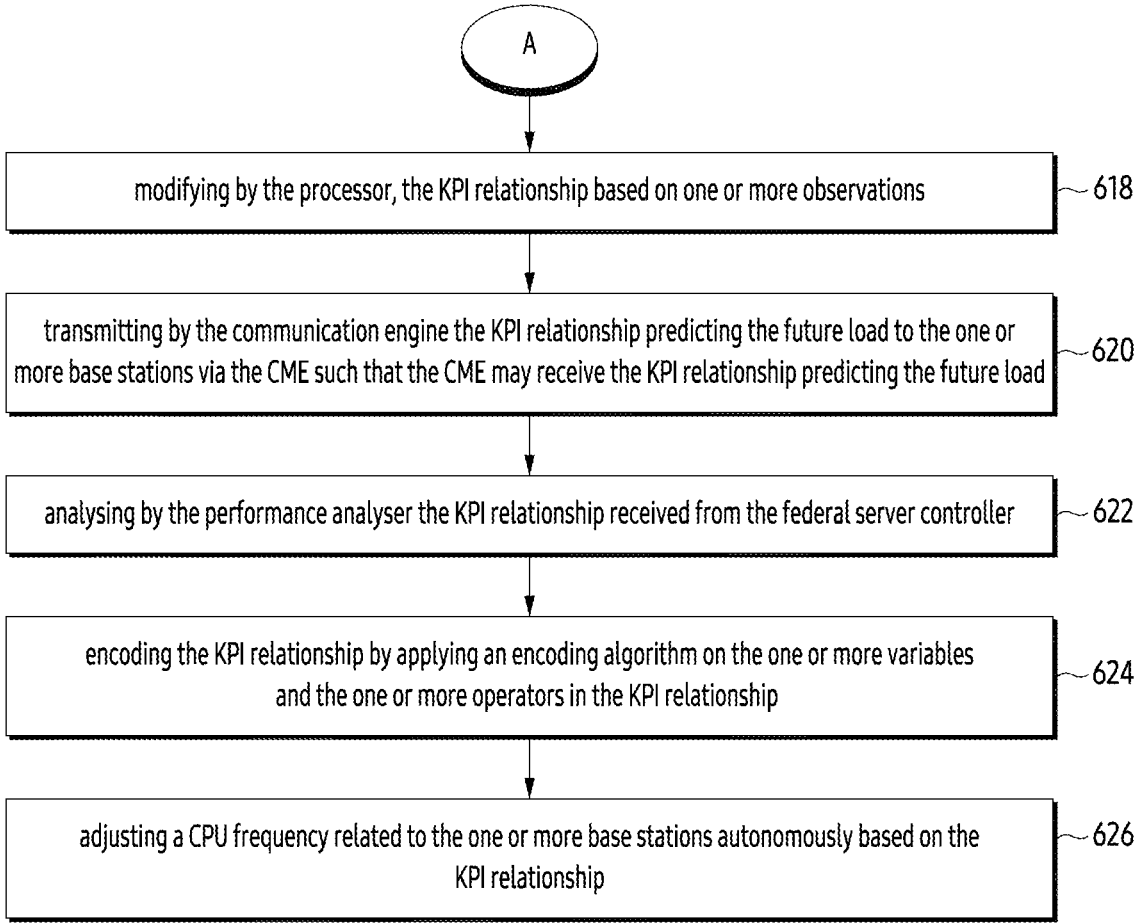

FIGS. 6A and 6B is a flowchart illustrating an example process 600 for a power management of one or more base stations in a wireless communication network, according to various embodiments. The one or more base stations may be 202 as referred in FIG. 2. The power management may be performed to save an amount of power consumed by the one or more base stations 202. The amount of power may be saved based on a KPI relationship predicting a future load related to the one or more base stations 202. The relationship may be a mathematical function generated based on a number of KPI parameters related to the one or more base stations 202. The KPI relationship may be used by the one or more base stations for adjusting a CPU frequency related to the one or more base stations 202 for managing the future load associated with the one or more base stations.

At 602, the process 600 may include collecting the number of KPI parameters related to the related to each of the one or more base stations 202. The number of KPI parameters may be collected by the collection engine 316 as referred in FIG. 3. The number of KPI parameters may be collected from one or more E2 nodes and an O-cloud associated with the one or more base stations 202 in a periodic manner. In an example embodiment, the number of KPI parameters may be collected after a predetermined amount of time. The number of KPI parameters may be time-series data coming out of each gNB/eNBs. Examples of the number of KPI parameters may include, but are not limited to, at least one of an average load, a CPU Frequency, a downlink throughput, an uplink throughput, a number of UE connected to the one or more base stations, a maximum throughput associated with the one or more base stations, an average number of UE connected to the one or more base stations, a maximum number of UE connected to the one or more base stations, an average CPU usage, an average memory usage, a maximum memory usage, a minimum memory usage, an average SSD usage, a maximum SSD usage, and a minimum SSD usage.

At 604, the process 600 may include determining a value related to each KPI parameter amongst the number of KPI parameters is greater than a respective threshold value associated with each KPI parameter amongst the number of KPI parameters. The determination may be performed by the processor 302 as referred in FIG. 2.

At 606, the process 600 may include transmitting the number of KPI parameters to the federal server controller 206 as referred in FIG. 2 when it is determined that the value related to each KPI parameter is greater than the respective threshold value. The transmission may be performed by communication engine 314 as referred in FIG. 3. The transmission of the number of KPI parameters may be performed via the CME 204 as referred in FIG. 2 such that the CME 204 may be configured to receive the number of KPI parameters and the federal server controller 206 may be configured to receive the number of KPI parameters from the CME 204.

At 608, the process 600 may include receiving the number of KPI parameters by the CME 204 at the communication engine 414 as referred in FIG. 4 from the one or more base stations 202.

At 610, the process 600 may include generating the ML based model based on the number of KPI parameters. The ML based model may be generated and trained by the generation engine 416 with the number of KPI parameters related to the one or more base stations 202. The process 600 may include transmitting by the communication engine 414, the ML based model to the federal server controller 206. The process 600 may include receiving by the communication engine 514 the ML based model trained with the number of KPI parameters from the CME 204.

At 612, the process 600 may include identifying a CPU core load, one or more correlated KPI parameters amongst the number of KPI parameters, and one or more conditions from the ML based model. The identification may be performed by the processor 502 as referred in FIG. 5. Examples of the one or more conditions may include, but are not limited to, the number of KPI parameters related to the one or more base stations is collected at a previous time stamp, a value of a loss is low while deriving the KPI relationship to increase an accuracy of the KPI relationship such that RMSE may be low, and a computational complexity of the KPI relationship to be derived is low such as a minimize log, exponents, higher degree powers.

At 614, the process 600 may include pre-processing the number of KPI parameters to filter one or more irregularities in the plurality of KPI parameters by the processor 502. In response to pre-processing, the processor 502 may be configured to quantify a correlation between the one or more correlated KPI parameters amongst the plurality of KPI parameters. Further, the processor 502 may be configured to initialize an approximate KPI relationship. The approximate KPI relationship may be initialized based on the CPU core load, the one or more correlated KPI parameters amongst the number of KPI parameters, and the one or more conditions.

At 616, the process 600 may include performing a curve fitting through a regression to derive the KPI relationship. The curve fitting may include adjusting the approximate KPI relationship to perform a number of iterations for deriving the KPI relationship. The curve fitting may include employing a ML technique to derive the KPI relationship. The KPI relationship may include one or more coefficients, one or more variables and one or more operators related to the one or more variables. The regression may be one of a linear regression, a power regression, and an exponent regression.

At 618, the process 600 may include modifying by the processor 502, the KPI relationship based on one or more observations. Modifying the KPI relationship may include changing one or more terms related to the KPI relationship. Further, the process 600 may include calculating by the processor 502 an accuracy of the KPI relationship upon performing the curve fitting on the KPI relationship. In an embodiment, where it is determined that the accuracy is low, the KPI relationship is changed, and the one or more coefficients are reinitialized. Further, when the accuracy is not low, the KPI relationship may be tuned with the one or more coefficients. Furthermore, the process 600 may include analysing by the processor 502 the KPI relationship based on the accuracy, the computational complexity, a past prediction record, and the number of KPI parameters.

At 620, the process 600 may include transmitting by the communication engine 514 the KPI relationship predicting the future load to the one or more base stations 202 via the CME 204 such that the CME 204 may receive the KPI relationship predicting the future load.

At 622, the process may include analysing by the performance analyser 418 the KPI relationship received from the federal server controller 206. The analysis may be performed based on an accuracy, a computational complexity, a past prediction record, and the number of KPI parameters. In an embodiment, the KPI relationship may be analysed at the federal server controller 206 prior to transmission of the KPI relationship from the federal server controller 206 to the CME 204.

At 624, the process 600 may include encoding the KPI relationship by applying an encoding technique on the one or more variables and the one or more operators in the KPI relationship. Examples of the encoding technique may include, but are not limited to, a Huffman code technique. The encoding of the one or more variables and the one or more operators may be pre-populated on the CME 204 and the one or more base stations 202 for an easy translation. Further, the process 600 may include transmitting the KPI relationship predicting the future load to the one or more base stations 202.

At 626, the process 600 may include adjusting a CPU frequency related to the one or more base stations 202 autonomously based on the KPI relationship. The adjustment may be performed for managing the future load associated with the one or more base stations 202. The processor 302 may be configured to adjust the CPU frequency by applying the KPI relationship at the one or more base stations 202. The KPI relationship may be applied through a CPU governor associated with the one or more base stations. The CPU governor may be a Linux Governor through which the KPI relationship may be realized at the one or more base stations 202.

Figure 7:
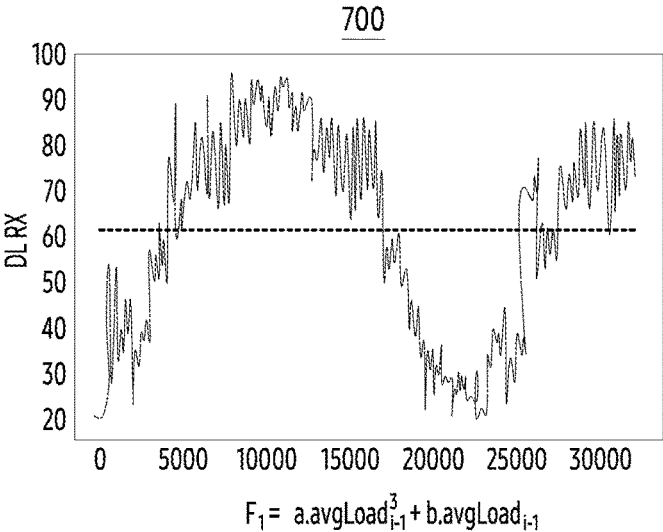
FIG. 7 includes graphs illustrating a number of adjustments performed on an approximate KPI relationship, according to various embodiments.
Figure 7:
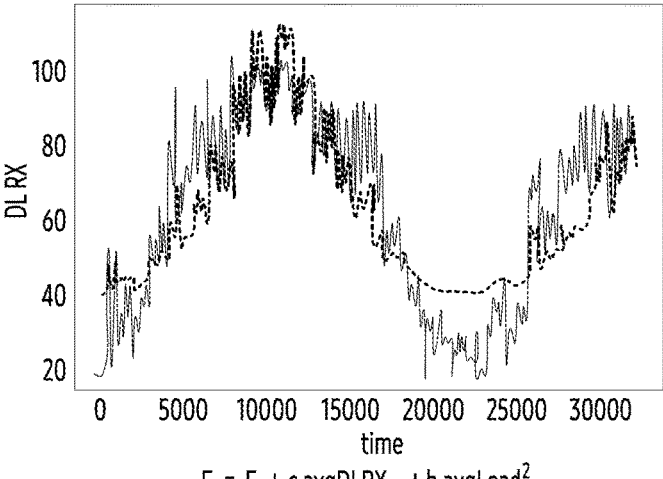
Figure 7:
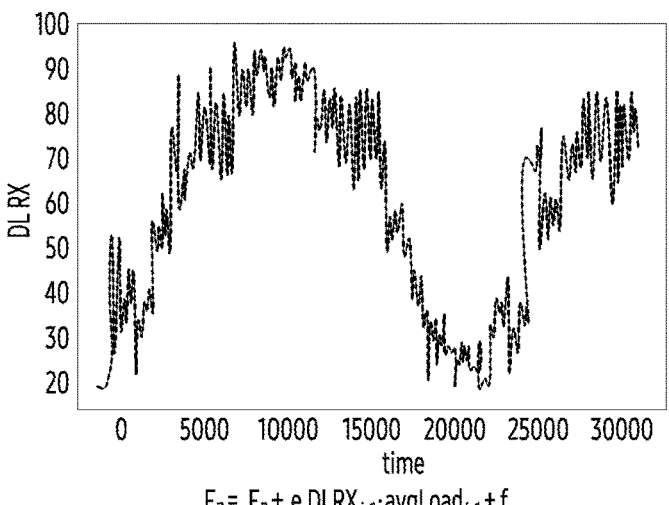

FIG. 7 includes graphs 700 illustrating an example number of adjustments performed on an approximate KPI relationship, according to various embodiments. The number of adjustments may be performed on the approximate KPI relationship to derive a KPI relationship to be deployed at the one or more base stations 202 as referred in FIG. 2 for managing a power consumption at the one or more base stations 202. Performing the number of adjustments may result in generation of a number of iterations as depicted by the graphical representation 600. In an example embodiment, the number of iterations generated may be "10". The approximate KPI relation may be "F1" as illustrated below:

$$a \cdot avgLoad_{i-1}^3 + b \cdot avgLoad_{i-1}.$$

Upon performing 5 iterations from the number of iterations to adjust the approximate KPI relationship, the approximate KPI relation "F2" may be generated as illustrated below:

$$F_1 + c \cdot avgDLRX_{i-1} + d \cdot DLRX_{i-1}^2$$

Upon performing another 5 iterations to adjust the approximate KPI relationship, the approximate KPI relation "F3" may be generated as mentioned below:

$$F_2 + e \cdot DLRX_{i-1} \cdot avgDLRX_{i-1} + f$$

Figure 8:
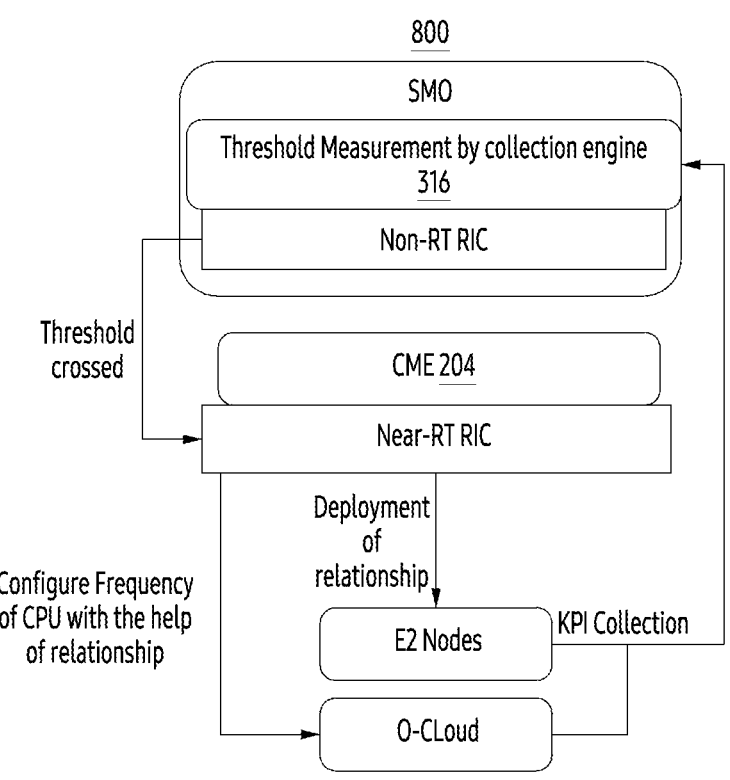
FIG. 8 is a diagram illustrating an example process for a centralized learning and a distributed realization of a KPI relationship predicting a future load, according to various embodiments.

FIG. 8 is a diagram illustrating an example process 800 for a centralized learning and a distributed realization of a KPI relationship predicting a future load, according to various embodiments. The KPI relationship predicting the future load may be related to the one or more base stations 202. The collection engine 316 in a non-Real Time Radio Intelligent Controller (RT RIC) may be configured to collect a number of KPI parameters from one or more E2 nodes and one or more O-clouds. Further, the collection engine 316 may be configured to measure a value related to each of the number of KPI parameters. In an embodiment, where it is determined that a threshold value related to the number of KPI parameters is crossed, the communication engine 316 may be triggered to transmit the number of KPI parameters to the CME 204. The CME 204 in a near-RT RIC may be configured to select a KPI relationship, from a pre-defined datastore. Further, the CME 204 may transmit the KPI relationship to the one or more base stations 202 for deployment.

Figure 9:
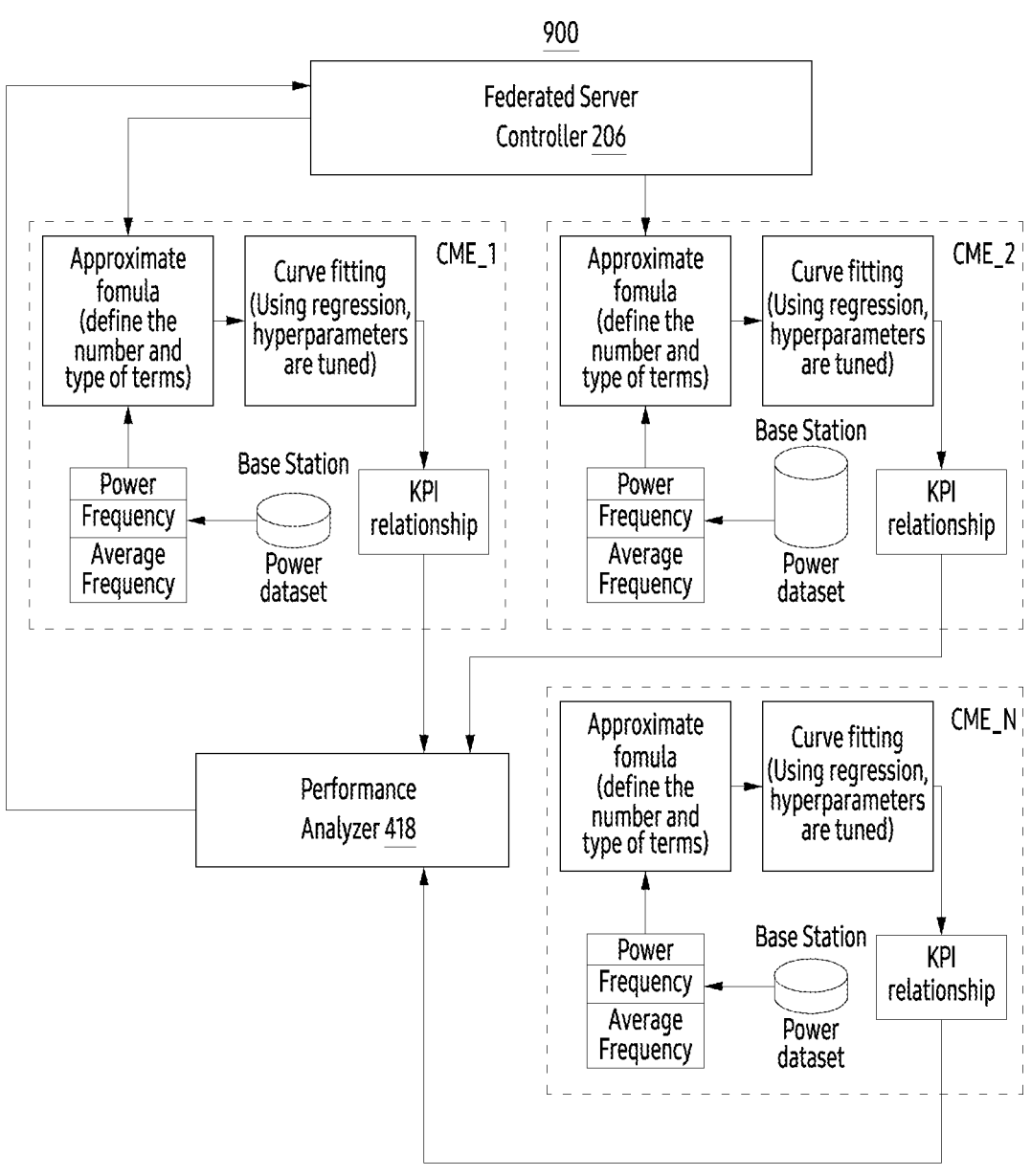
FIG. 9 is a diagram illustrating an example process for performing a federated learning, according to various embodiments.

FIG. 9 is a diagram illustrating an example process 900 for performing a federated learning, according to various embodiments. The federated learning may be performed by the processor 502 incorporated within the federal server controller 206 as referred in FIG. 2 for deriving a KPI relationship based on a number of KPI parameters related to the one or more base stations 202 as referred in FIG. 2. The processor 502 may be configured to analyse the KPI relationship and updates approximations at the one or more base stations 202. The approximations may be the number of KPI parameters related to the one or more base stations 202. Further, a number of new terms may be added to the KPI relationship and change a nature of a number of terms such as exponential terms, logistic terms, and power terms. Further, the processor 502 may be configured to create a common relationship also referred as the KPI relationship.

The performance analyser 418 may be configured to evaluate a performance of each Neural Network (NN) according to a prediction accuracy, a computational complexity, a past prediction record, and a size of a dataset. A methodology for a distributed realisation of the KPI relationship is illustrated below:

```
def round (nodes):
    """Do a round of federated learning."""
    # instruct each node to train and return its model
    updated_models=[node.train_model ( ) for node in
        self.nodes]
    # replace the server model with the weighted average of
        the node model
    server_model=fed_avg (updated_models)
    # replace the node models with the new server model
    for node in nodes:
        node.replace_model (server_model)
```

Based on the methodology, train_model( ) trains a local model for finding an appropriate KPI relationship at each base station separately. fed_avg( ) aggregates the appropriate KPI relationship from each CME. It combines the appropriate KPI relationship of each local CME and then finds common terms to arrive at a common KPI relationship. Replace_model( ) broadcasts the calculated global common KPI relationship to each of the one or more base stations 202. The methodology may be repeated till a required accuracy is achieved across the one or more base stations 202.

Figure 10:
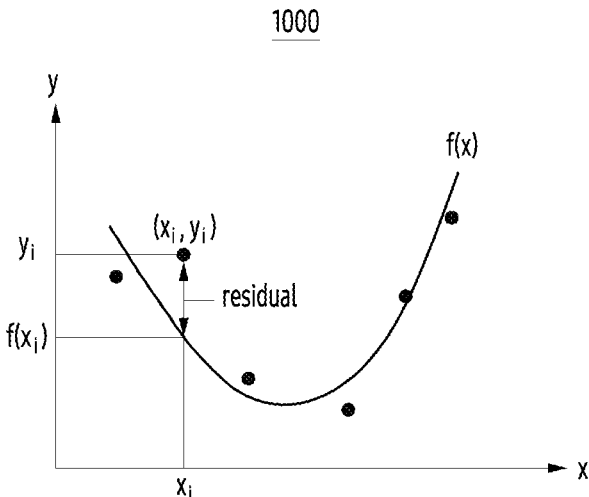
FIG. 10 is a graph illustrating an example regression function with a smooth curve, according to various embodiments.

FIG. 10 is a graph 1000 illustrating an example regression function with a smooth curve, according to various embodiments. A regression may be performed to generate the regression function with the smooth curve that may be designed stay as close as possible to data points in a "holistic" sense to be made precise. Further, the regression may be configured to allow an interpolation and an extrapolation of data by choosing a test value of an independent variable, and substituting the test value into the regression function, and using a result to estimate a corresponding value of a dependent variable. Further, the regression functions may allow one to interpolate and extrapolate data by choosing some test value of the independent variable, substituting it into a model for the regression function, and using the result to estimate the corresponding value of the dependent variable. In an embodiment, "N" may denote a number of distinct values of the independent variable within a dataset. Further, a number of parameters in a class of functions being used to fit the data may not exceed N.

FIG. 11 is a diagram 1100 illustrating example encoding of a KPI relationship at the CME 204, according to various embodiments. Encoding the KPI relationship may be based on applying an encoding technique on one or more variables and one or more operators in the KPI relationship. Examples of the encoding technique may include, but are not limited to, a Huffman code technique. The encoding of the one or more variables and the one or more operators may be pre-populated on the CME 204 and the one or more base stations 202 for an easy translation.

FIG. 12 is a flowchart illustrating an example method 1200 implemented at one or more base stations for a power management of the one or more base stations in a wireless communication network, according to various embodiments. In an embodiment, the method 1200 may be executed by the one or more base stations 202. Further, for the sake of brevity, details of the present subject matter that are explained in detail in the description of FIG. 1 to FIG. 11 may not be explained in detail in the description of FIG. 12.

At 1202, the method 1200 includes transmitting, by the one or more base stations, a plurality of Key Performance Indicator (KPI) parameters associated with the one or more base stations to a federal server controller.

At 1204, the method 1200 includes receiving, by the one or more base stations from the federal server controller, a KPI relationship predicting a future load based on the plurality of KPI parameters associated with the one or more base stations.

At 1206, the method 1200 includes adjusting, by the one or more base stations, a Central Processing Unit (CPU) frequency associated with the one or more base stations autonomously based on the KPI relationship for managing the future load associated with the one or more base stations.

FIG. 13 is a flowchart illustrating an example method 1300 at a CME for a power management of one or more base stations in a wireless communication network, according to various embodiments. In an embodiment, the method 1300 may be executed by the CME 204. Further, for the sake of brevity, details of the present subject matter that are explained in detail in the description of FIG. 1 to FIG. 12 may not be explained in detail in the description of FIG. 13.

At 1302, the method 1300 includes receiving, by a CME, a plurality of KPI parameters associated with the one or more base station from the one or more base stations.

At 1304, the method 1300 includes generating, by the CME, a Machine Learning (ML) based model based on the plurality of KPI parameters.

At 1306, the method 1300 includes transmitting, by the CME, the ML model to the federal server controller.

At 1308, the method 1300 includes receiving, by the CME, a KPI relationship derived from the ML model predicting a future load associated with the one or more base stations based on the plurality of KPI parameters upon training of the ML based model from the federal server controller.

At 1310, the method 1300 includes transmitting, by the CME, the KPI relationship predicting the future load to the one or more base stations in response to receiving the KPI relationship and the predicted future load from the federal server controller, wherein the one or more base station adjusts a Central Processing Unit (CPU) frequency at the one or more base station based on the KPI relationship predicting the future load to manage a future load of the one or more base stations.

According to various embodiments, a method implemented at one or more base stations for a power management of the one or more base stations in a wireless communication network, the method comprises transmitting, by the one or more base stations, a plurality of key performance indicator (KPI) parameters associated with the one or more base stations to a federal server controller, receiving, by the one or more base stations from the federal server controller, a KPI relationship predicting a future load based on the plurality of KPI parameters associated with the one or more base stations, and adjusting, by the one or more base stations, a central processing unit (CPU) frequency associated with the one or more base stations autonomously based on the KPI relationship for managing the future load associated with the one or more base stations.

In some embodiments, the one or more base stations and the federal server controller communicate with one another via a central management entity (CME).

In some embodiments, the adjusting of the CPU frequency comprises applying the KPI relationship at the one or more base stations through a CPU governor associated with the one or more base stations.

In some embodiments, the method further comprises collecting, by the one or more base stations, the plurality of KPI parameters from one or more E2 nodes and an O-cloud associated with the one or more base stations in a periodic manner, and determining, by the one or more base stations, whether a value associated with each of the plurality of KPI parameters is greater than a respective threshold value associated with each of the plurality of KPI parameters, wherein the plurality of KPI parameters is transmitted to the CME in response to determining that the value associated with each of the plurality of KPI parameters is greater than the respective threshold value.

In some embodiments, the plurality of KPI parameters comprises at least one of an average load, a CPU Frequency, a downlink throughput, an uplink throughput, a plurality of user equipment (UE) connected to the one or more base stations, a maximum throughput associated with the one or more base stations, an average plurality of UE connected to the one or more base stations, a maximum plurality of UE connected to the one or more base stations, an average CPU usage, an average memory usage, a maximum memory usage, a minimum memory usage, an average solid state drive (SSD) usage, a maximum SSD usage, and a minimum SSD usage.

According to various embodiments, a method implemented at a central management entity (CME) for a power management of one or more base stations in a wireless communication network, comprises receiving, by a CME, a plurality of key performance indicator (KPI) parameters associated with the one or more base stations from the one or more base stations, generating, by the CME, a machine learning (ML) based model based on the plurality of KPI parameters, transmitting, by the CME, the ML model to the federal server controller, receiving, by the CME, a KPI relationship derived from the ML model predicting a future load associated with the one or more base stations based on the plurality of KPI parameters upon training of the ML based model from the federal server controller, and transmitting, by the CME the KPI relationship predicting the future load to the one or more base stations in response to receiving the KPI relationship and the predicted future load from the federal server controller, wherein the one or more base stations adjusts a central processing unit (CPU) frequency at the one or more base stations based on the KPI relationship predicting the future load to manage a future load of the one or more base stations.

In some embodiments, the deriving of the KPI relationship comprises receiving, by the federal server controller, the ML based model trained with the plurality of KPI parameters, identifying, by the federal server controller, a CPU core load, one or more correlated KPI parameters amongst the plurality of KPI parameters, and one or more conditions from the ML based model, initializing, by the federal server controller, an approximate KPI relationship based on the CPU core load, the one or more correlated KPI parameters amongst the plurality of KPI parameters, and the one or more conditions, and performing, by the federal server controller, a curve fitting through a regression to derive the KPI relationship, wherein the KPI relationship comprises one or more coefficients.

In some embodiments, the one or more conditions comprises the plurality of KPI parameters associated with the one or more base stations being collected at a previous time stamp, a value of a loss being low while deriving the KPI relationship to increase an accuracy of the KPI relationship, and a computational complexity of the KPI relationship to be derived being low.

In some embodiments, the method further comprises modifying, by the federal server controller, the KPI relationship based on one or more observations, wherein the modifying the KPI relationship comprises changing one or more terms associated with the KPI relationship, and calculating, by the federal server controller, an accuracy of the KPI relationship upon performing the curve fitting on the KPI relationship.

In some embodiments, the regression is one of a linear regression, a power regression, and an exponent regression.

In some embodiments, the transmitting of the KPI relationship comprises analysing, by the CME, the KPI relationship based on an accuracy, a computational complexity, a past prediction record, and the plurality of KPI parameters, and encoding, by the CME, the KPI relationship upon analysing the KPI relationship.

In some embodiments, the method further comprises pre-processing, by the federal server controller, the plurality of KPI parameters to filter one or more irregularities in the plurality of KPI parameters, and quantifying, by the federal server controller, a correlation between the one or more correlated KPI parameters amongst the plurality of KPI parameters.

According to various embodiments, a system implemented at one or more base stations for a power management of the one or more base stations in a wireless communication network, the system comprises one or more base stations configured to: transmit a plurality of key performance indicator (KPI) parameters associated with the one or more base stations to a federal server controller, receive from the federal server controller, a KPI relationship predicting a future load based on the plurality of KPI parameters associated with the one or more base stations, and adjust a central processing unit (CPU) frequency associated with the one or more base stations autonomously based on the KPI relationship for managing the future load associated with the one or more base stations.

In some embodiments, wherein the one or more base stations and the federal server controller are configured to communicate with one another via a central management entity (CME) comprising circuitry.

In some embodiments, wherein the adjusting the CPU frequency comprises applying the KPI relationship at the one or more base stations through a CPU governor associated with the one or more base stations.

In some embodiments, wherein the one or more base stations are further configured to collect the plurality of KPI parameters from one or more E2 nodes and an O-cloud associated with the one or more base stations in a periodic manner, and determine whether a value associated with each of the plurality of KPI parameters is greater than a respective threshold value associated with each of the plurality of KPI parameters, wherein the plurality of KPI parameters is configured to be transmitted to the CME in response to determining that the value associated with each of the plurality of KPI parameters is greater than the respective threshold value.

In some embodiments, the plurality of KPI parameters comprises at least one of an average load, a CPU Frequency, a downlink throughput, an uplink throughput, a plurality of user equipment (UE) connected to the one or more base stations (202), a maximum throughput associated with the one or more base stations (202), average plurality of UE connected to the one or more base stations (202), a maximum plurality of UE connected to the one or more base stations (202), an average CPU usage, an average memory usage, a maximum memory usage, a minimum memory usage, an average solid state drive (SSD) usage, a maximum SSD usage, and a minimum SSD usage.

According to various embodiments, a system implemented at a central management entity (CME) for a power management of one or more base stations in a wireless communication network, configured to receive a plurality of KPI associated with the one or more base stations from the one or more base stations, generate a machine learning (ML) based model based on the plurality of KPI parameters, transmit the ML model to the federal server controller, receive a KPI relationship derived from the ML model predicting a future load associated with the one or more base stations based on the plurality of KPI parameters upon training of the ML based model from the federal server controller, and transmit the KPI relationship predicting the future load to the one or more base stations in response to receiving the KPI relationship and the predicted future load from the federal server controller, wherein the one or more base stations is configured to adjust a central processing unit (CPU) frequency at the one or more base stations based on the KPI relationship predicting the future load to manage a future load of the one or more base stations.

In some embodiments, wherein in deriving the KPI relationship the federal server controller is configured to receive the ML based model trained with the plurality of KPI parameters, and identify a CPU core load, one or more correlated KPI parameters amongst the plurality of KPI parameters, and one or more conditions from the ML based model, initialize an approximate KPI relationship based on the CPU core load, the one or more correlated KPI parameters amongst the plurality of KPI parameters, and the one or more conditions, and perform a curve fitting through a regression to drive the KPI relationship, wherein the KPI relationship comprises one or more coefficients.

In some embodiments, wherein the one or more conditions comprises the plurality of KPI parameters associated with the one or more base stations being collected at a previous time stamp,
a value of a loss is low while deriving the KPI relationship to increase an accuracy of the KPI relationship, and a computational complexity of the KPI relationship to be derived is low.

In some embodiments, wherein the federal server controller is further configured to modify the KPI relationship based on one or more observations, wherein the modifying the KPI relationship comprises changing one or more terms associated with the KPI relationship, and calculate an accuracy of the KPI relationship upon performing the curve fitting on the KPI relationship.

In some embodiments, the regression is one of a linear regression, a power regression, and an exponent regression.

In some embodiments, in transmitting the KPI relationship, the CME is configured to analyse the KPI relationship based on an accuracy, a computational complexity, a past prediction record, and the plurality of KPI parameters, and encode the KPI relationship upon calculating the analysing the KPI relationship.

In some embodiments, the federal server controller is further configured to pre-process the plurality of KPI parameters to filter one or more irregularities in the plurality of KPI parameters, and quantify a correlation between the one or more correlated KPI parameters amongst the plurality of KPI parameters.

While specific language has been used to describe the various example embodiments, any limitations arising on account of the same are not intended. As would be apparent to one skilled in the art, various working modifications may be made to the method in order to implement the disclosure as taught herein. The drawings and the forgoing description give examples of various embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flowchart need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the description or not, such as differences in structure, dimension, and use of material, are possible. The scope of embodiments is at least as broad as given by the following claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a base station for a power management in a communication network, the method comprising:

transmitting, to a central management entity (CME), a key performance indicator (KPI) parameter of the base station;

receiving, from a federal server controller via the CME, a KPI relationship determined based on one or more KPI parameters of one or more base stations including the base station, wherein the KPI relationship is used for predicting a future load of the one or more base stations; and adjusting a central processing unit (CPU) frequency of the base station based on the KPI relationship.

2. The method of claim 1, wherein adjusting the CPU frequency comprises applying the KPI relationship through a CPU governor of the base station.

3. The method of claim 1, wherein transmitting the KPI parameter comprises:

collecting the KPI parameter from a E2 node or an O-cloud associated with the base station in a periodic manner;

determining whether a value associated with the KPI parameter is greater than a threshold value associated with the KPI parameter; and in response to determining that the value is greater than the threshold value, transmitting, to the CME, the KPI parameter.

4. The method of claim 1, wherein the KPI parameter is one of an average load, a CPU Frequency, a downlink throughput, an uplink throughput, a plurality of user equipment (UE) connected to the one or more base stations, a maximum throughput associated with the one or more base stations, an average plurality of UE connected to the one or more base stations, a maximum plurality of UE connected to the one or more base stations, an average CPU usage, an average memory usage, a maximum memory usage, a minimum memory usage, an average solid state drive (SSD) usage, a maximum SSD usage, or a minimum SSD usage.

5. A method performed by a central management entity (CME) for a power management of one or more base stations in a communication network, the method comprising:

receiving, from the one or more base stations, a plurality of key performance indicator (KPI) parameters of the one or more base stations;

generating a machine learning (ML) based model based on the plurality of KPI parameters;

transmitting, to a federal server controller, the ML based model;

receiving, from the federal server controller, a KPI relationship determined based on the ML based model, wherein the KPI relationship is used for predicting a future load of the one or more base stations; and transmitting, to the one or more base stations, the KPI relationship in response to receiving the KPI relationship from the federal server controller.

6. The method of claim 5, wherein the KPI parameter is one of an average load, a CPU Frequency, a downlink throughput, an uplink throughput, a plurality of user equipment (UE) connected to the one or more base stations, a maximum throughput associated with the one or more base stations, an average plurality of UE connected to the one or more base stations, a maximum plurality of UE connected to the one or more base stations, an average CPU usage, an average memory usage, a maximum memory usage, a minimum memory usage, an average solid state drive (SSD) usage, a maximum SSD usage, or a minimum SSD usage.

7. The method of claim 5, wherein transmitting the KPI relationship comprises:

analyzing the KPI relationship based on an accuracy, a computational complexity, a past prediction record, and the plurality of KPI parameters; and encoding the KPI relationship upon analyzing the KPI relationship.

8. A base station for a power management, comprising:

communication circuitry;

memory, including one or more storage media, storing instructions; and at least one processor including processing circuitry, wherein the instructions, when executed by the at least one processor, cause the base station to:

transmit, to a central management entity (CME), a key performance indicator (KPI) parameter of the base station;

receive, from a federal server controller via the CME, a KPI relationship determined based on one or more KPI parameters of one or more base stations including the base station, wherein the KPI relationship is used for predicting a future load of the one or more base stations; and adjust a central processing unit (CPU) frequency of the base station based on the KPI relationship.

9. The base station of claim 8, wherein instructions, when executed by the at least one processor, cause the base station to:

apply the KPI relationship through a CPU governor of the base station.

10. The base station of claim 8, wherein the instructions, when executed by the at least one processor, cause the base station to:

collect the KPI parameter from a E2 node or an O-cloud associated with the base station in a periodic manner;

determine whether a value associated with the KPI parameter is greater than a threshold value associated with the KPI parameter; and in response to determining that the value is greater than the threshold value, transmit the KPI parameter.

11. The base station of claim 8, wherein the KPI parameter is one of an average load, a CPU Frequency, a downlink throughput, an uplink throughput, a plurality of user equipment (UE) connected to the one or more base stations (202), a maximum throughput associated with the one or more base stations (202), average plurality of UE connected to the one or more base stations (202), a maximum plurality of UE connected to the one or more base stations (202), an average CPU usage, an average memory usage, a maximum memory usage, a minimum memory usage, an average solid state drive (SSD) usage, a maximum SSD usage, or a minimum SSD usage.

12. A central management entity (CME) for a power management of one or more base stations in a communication network, comprising:

communication circuitry;

memory, including one or more storage media, storing instructions; and at least one processor including processing circuitry, wherein the instructions, when executed by the at least one processor, cause the CME to:

receive, from the one or more base stations, a plurality of key performance indicator (KPI) parameters of the one or more base stations;

generate a machine learning (ML) based model based on the plurality of KPI parameters;

transmit, to a federal server controller, the ML based model;

receive, from the federal server controller, a KPI relationship determined based on the ML based model, wherein the KPI relationship is used for predicting a future load of the one or more base stations; and transmit, to the one or more base stations, the KPI relationship in response to receiving the KPI relationship from the federal server controller.

13. The CME of claim 12, wherein the KPI parameter is one of an average load, a CPU Frequency, a downlink throughput, an uplink throughput, a plurality of user equipment (UE) connected to the one or more base stations, a maximum throughput associated with the one or more base stations, an average plurality of UE connected to the one or more base stations, a maximum plurality of UE connected to the one or more base stations, an average CPU usage, an average memory usage, a maximum memory usage, a minimum memory usage, an average solid state drive (SSD) usage, a maximum SSD usage, or a minimum SSD usage.

14. The CME of claim 12, wherein instructions, when executed by the at least one processor, cause the CME to:

analyze the KPI relationship based on an accuracy, a computational complexity, a past prediction record, and the plurality of KPI parameters; and encode the KPI relationship upon analyzing the KPI relationship.

\* \* \* \* \*